United States Patent
Nishino et al.

(10) Patent No.: US 7,800,715 B2
(45) Date of Patent: Sep. 21, 2010

(54) LIQUID CRYSTAL DISPLAY DEVICE VIEWABLE FROM BOTH SURFACES AND PORTABLE APPARATUS USING SAME

(75) Inventors: Toshiharu Nishino, Hamura (JP); Norihiro Arai, Hino (JP); Kunpei Kobayashi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/179,378

(22) Filed: Jul. 24, 2008

(65) Prior Publication Data

US 2009/0091685 A1 Apr. 9, 2009

Related U.S. Application Data

(62) Division of application No. 10/531,392, filed as application No. PCT/JP03/13663 on Oct. 24, 2003, now abandoned.

(30) Foreign Application Priority Data

Oct. 29, 2002 (JP) ............................. 2002-314388

(51) Int. Cl.
*G02F 1/1335* (2006.01)
(52) U.S. Cl. ..................... 349/96; 349/114; 349/117; 349/112; 349/63
(58) Field of Classification Search ............... 349/63, 349/96, 113, 114, 112, 117
See application file for complete search history.

(56) References Cited

U.S. PATENT DOCUMENTS

| | | | |
|---|---|---|---|
| 6,329,967 B1 | 12/2001 | Little et al. | |
| 6,329,968 B1 | 12/2001 | Cornelissen et al. | |
| 6,341,002 B1 | 1/2002 | Shimizu et al. | |
| 6,456,347 B1 | 9/2002 | Motomura et al. | |
| 6,633,353 B1 | 10/2003 | Seki et al. | |
| 6,674,496 B2 | 1/2004 | Wei | |
| 6,693,692 B1 | 2/2004 | Kaneko et al. | |
| 6,822,711 B1 * | 11/2004 | Yoshida et al. | 349/115 |
| 7,002,649 B2 | 2/2006 | Yuuki et al. | |

(Continued)

FOREIGN PATENT DOCUMENTS

EP 1 245 994 A1 10/2002

(Continued)

OTHER PUBLICATIONS

Japanese Office Action (and English translation thereof) dated Sep. 16, 2008, issued in a counterpart Japanese Application.

*Primary Examiner*—Thoi V Duong
(74) *Attorney, Agent, or Firm*—Frishauf, Holtz, Goodman & Chick, P.C.

(57) ABSTRACT

In front of a liquid crystal display element, a surface light source is arranged which emits a light toward the liquid crystal display element and lets lights coming from its front and its back permeate therethrough. The liquid crystal display element has reflection/permeation means which is provided behind a liquid crystal cell and a liquid crystal layer, and which reflects a part of a light that comes to each of a plurality of pixels from the front of the liquid crystal cell, and lets the other part of the light permeate the reflection/permeation means.

14 Claims, 9 Drawing Sheets

U.S. PATENT DOCUMENTS

| | | |
|---|---|---|
| 7,139,053 B2 | 11/2006 | Yuuki et al. |
| 2001/0040658 A1 | 11/2001 | Nemoto et al. |
| 2002/0041351 A1 | 4/2002 | Baek |
| 2002/0113923 A1* | 8/2002 | Kashima et al. ............... 349/96 |
| 2002/0180911 A1 | 12/2002 | Iijima |
| 2004/0027513 A1 | 2/2004 | Yuuki et al. |
| 2006/0007372 A1 | 1/2006 | Yuuki et al. |

FOREIGN PATENT DOCUMENTS

| | | |
|---|---|---|
| JP | 10-090678 A | 4/1998 |
| JP | 2000-193946 A | 7/2000 |
| JP | 2000-267092 A | 9/2000 |
| JP | 2001-507483 A | 6/2001 |
| JP | 2001-257754 A | 9/2001 |
| JP | 2001-290445 A | 10/2001 |
| JP | 2001-305525 A | 10/2001 |
| JP | 2002-357825 A | 12/2002 |
| JP | 2003-161941 A | 6/2003 |
| WO | WO 00/04417 A1 | 1/2000 |

* cited by examiner

LIQUID CRYSTAL DISPLAY DEVICE VIEWABLE FROM BOTH SURFACES AND PORTABLE APPARATUS USING SAME

CROSS-REFERENCE TO RELATED APPLICATION

The present application is a Divisional application of U.S. application Ser. No. 10/531,392 filed Apr. 14, 2005, now abandoned, which is incorporated herein by reference. U.S. Ser. No. 10/531,392 is a U.S. National Phase Application under 35 USC 371 of International Application PCT/JP2003/13663 filed Oct. 24, 2003.

TECHNICAL FIELD

The present invention relates to a both surface display type liquid crystal display device and a portable apparatus having a both surface display function.

BACKGROUND ART

As disclosed in Unexamined Japanese Patent Application KOKAI Publication No. H10-90678 and Unexamined Japanese Patent Application KOKAI Publication No. 2001-290445, a liquid crystal display device in which two liquid crystal display elements are disposed back to back with their display surfaces facing the opposite directions from each other, and a surface light source for emitting a light toward both the liquid crystal display elements is disposed between them, is known as a both surface display type liquid crystal display device to be used in a portable apparatus such as a portable phone, which has a display function on both surfaces of its case.

However, using two liquid crystal display elements as described above costs high, and both surface display with the use of one liquid crystal display element is desired.

As a liquid crystal display device for both surface display using one liquid crystal display element, there is proposed a liquid crystal display device in which the screen area of a liquid crystal display element is divided into a first screen portion and a second screen portion so that an image to be viewed from the front is displayed by the first screen portion and an image to be viewed from the back is displayed by the second screen portion, as disclosed in Unexamined Japanese Patent Application KOKAI Publication No. 2000-193946 and Unexamined Japanese Patent Application KOKAI Publication No. 2001-305525.

However, in a both surface display type liquid crystal display device having the screen area of its liquid crystal display element divided into a first and a second screen portions, the entire display area of the liquid crystal display element has a size corresponding to the size of the display screen for the front plus the size of the display screen for the back which are arranged side by side. Therefore, the occupation area of this liquid crystal display device is much larger than that of a display screen for either front or back display. Accordingly, this liquid crystal display device can not be used in a portable apparatus such as a portable phone, in which the mount space for a liquid crystal display device is limited.

DISCLOSURE OF INVENTION

It is an object of the present invention to provide a liquid crystal display device which is capable of both surface display using one liquid crystal display element, capable of reducing its occupation area, and capable of displaying an image to be viewed from one surface and an image to be viewed from the other surface in a display manner using a light from a surface light source and in a display manner using an external light existing in the external environment.

It is another object of the present invention to provide a liquid crystal display device which is capable of being miniaturized as a portable apparatus having a both surface display function, capable of displaying images to be viewed from the respective surfaces in a sufficiently large screen size, and capable of displaying images to be viewed form the respective surfaces in a display manner using a light from a surface light source of the liquid crystal display device and in a display manner using an external light.

To achieve the above objects, a liquid crystal display device according to a first aspect of the present invention comprises:

a first substrate (3) and a second substrate (4) which are arranged so as to oppose to each other:

at least one first electrode (6) which is formed on one of opposing internal surfaces of the first substrate (3) and the second substrate (4);

a plurality of second electrodes (7) which are formed on the other of the opposing internal surfaces of the first substrate(3) and the second substrate (4), and which form a plurality of pixels (80) arranged in a matrix in an area opposing to the first electrode (6) on the one internal surface;

a liquid crystal layer (5) which is sealed in a predetermined gap between the first substrate (3) and the second substrate (4);

a pair of polarizing plates (16, 17) which are arranged so as to sandwich the first substrate (3) and the second substrate (4); and reflection/permeation means which is provided between the liquid crystal layer (5) and one of the pair of polarizing plates (16, 17), and which reflects a part of a light coming to each of the plurality of pixels (80) and lets the other of the light permeate the reflection/permeation means; and a surface light source (25) which is arranged so as to oppose to the other of the pair of polarizing plates (16, 17), and which emits a light toward the opposing other polarizing plate (16), and lets lights coming to the surface light source (25) from a side of the opposing other polarizing plate (16) and from a side opposing to this side permeate the surface light source (25).

This liquid crystal display device displays an image to be viewed from the front by letting a light from the surface light source arranged at the front of the liquid crystal display element come to the liquid crystal display element, reflecting a part of the light coming to each of the plurality of pixels from the front of the liquid crystal display element by the reflection/permeation means, and emitting the reflected light toward the front of the surface light source, and displays an image to be viewed from the back by letting the other part of the light permeate the reflection/permeation means and emitting this light toward the back of the liquid crystal display element.

Since this liquid crystal display device displays an image to be viewed from the front by reflecting a part of a light coming to each of the plurality of pixels from the front of the liquid crystal display element, and displays an image to be viewed from the back by letting the other part of the light permeate, this liquid crystal display device can display both of an image to be viewed from the front and an image to be viewed from the back by using the entire display area of the liquid crystal display element. Accordingly, the display area of the liquid crystal display element needs only to have a size corresponding to the display screen for either front display or back display.

Accordingly, with this liquid crystal display device, it is possible to perform both surface display with the use of only one liquid crystal display element, and to make the occupation area of the liquid crystal display device smaller.

Further, in this liquid crystal display device, the surface light source which emits a light toward the liquid crystal display element and lets lights coming from its front and its back permeate therethrough is arranged at the front of the liquid crystal display element. Because of this, this liquid crystal display device can let an external light (a light in the external environment) coming from the front of the surface light source permeate the surface light source and then come to the liquid crystal display element, can emit a part of this light that is reflected by the reflection/permeation means toward the front of the surface light source, and can emit the other part of the light that permeates the reflection/permeation means toward the back of the liquid crystal display element, and at the same time, can let an external light coming from the back of the liquid crystal display element permeate the reflection/permeation means, a liquid crystal cell, and the surface light source so as to be emitted toward the front. Accordingly, this liquid crystal display device can display an image to be viewed from the front by reflection display using a light from the surface light source, by reflection display using an external light coming from the front of the surface light source, and by permeation display using an external light coming from the back of the liquid crystal display element, and can display an image to be viewed from the back by permeation display using a light from the surface light source and by permeation display using an external light coming from the front of the surface light source.

As described above, according to this liquid crystal display device of the present invention, both surface display can be achieved with the use of one liquid crystal display element, the occupation area can be reduced, and both of an image to be viewed from one surface (front surface) and an image to be viewed from the other surface (back surface) can be displayed in a display manner using a light from the surface light source and in a display manner using an external light which is a light in the external environment.

In this liquid crystal display device of the present invention, it is preferred that the reflection/permeation means is constituted by a half-transparent and half-reflection film (10) which reflects and allows permeation of, an incident light with a predetermined reflection ratio and a predetermined permeation ratio.

Further, it is preferred that the reflection/permeation means is arranged on the internal surface of the first substrate (3) or the second substrate (4) on a side of the one polarizing plate (17). The reflection/permeation means may be constituted by a reflection film (14) having an open portion (14a) and a reflection portion (14b) formed for each of the pixels (80) to constitute a partial reflection/permeation layer which reflects, of a light coming to each of the pixels (80), a light that comes to the reflection portion (14b), and lets a light that comes to the open portion (14a) permeate the reflection/permeation means. It is preferred that the partial reflection/permeation layer is constituted by a metal reflection film in which an opening having a predetermined size is formed for each of the plurality of pixels (80). Further, the reflection/permeation means may be constituted by a polarized light separating element (15) which reflects, of two different polarized components of an incident light, one polarized component, and lets the other polarized component permeate the reflection/permeation means.

The reflection/permeation means may be constituted by a reflecting/polarizing plate which serves also as the one polarizing plate (17), and which reflects, of two linearly-polarized components of an incident light which are orthogonal to each other, one polarized component, and lets the other polarized component permeate the reflection/permeation means. Further, it is preferred that at least one retardation plate (18, 19) is arranged between the pair of polarizing plates (16, 17), and a scattering layer (20) is arranged between the other polarizing plate (16) and the first substrate (3) or the second substrate (4) on a side of the other polarizing plate (16).

A liquid crystal display device according to a second aspect of the present invention comprises:

a first substrate (3) and a second substrate (4) which are arranged so as to oppose to each other, at least one first electrode (6) which is formed on one of opposing internal surfaces of the first substrate (3) and the second substrate (4);

a plurality of second electrodes (7) which are formed on the other of the opposing internal surfaces of the first substrate (3) and the second substrate (4), and which form a plurality of pixels (80) arranged in a matrix in an area opposing to the first electrode (6) on the one internal surface;

a liquid crystal layer (5) which is sealed in a predetermined gap between the first substrate (3) and the second substrate (4);

a pair of polarizing plates (16, 17) which are arranged so as to sandwich the first substrate (3) and the second substrate (4);

a liquid crystal display element which is provided between the liquid crystal layer (5) and one of the pair of polarizing plates (16, 17), and which includes a reflection/permeation layer which forms a reflection display region for reflecting a light coming to a region predefined in each of the plurality of pixels (80), and a permeation display region for letting a light coming to other than the reflection display region permeate the reflection/permeation layer; and a surface light source (25) which is arranged so as to oppose to the other of the pair of polarizing plates (16, 17), and which emits a light toward the liquid crystal display element, and lets lights coming to the surface light source (25) from a side of the opposing other polarizing plate (16) and from a side opposing to this side permeate the surface light source (25).

As described above, the reflection/permeation layer may be formed to correspond to a predetermined region and a region other than the predetermined region in each of the plurality of pixels, so that partial reflection/permeation for reflecting, of a light coming to each of the plurality of pixels, a light that comes to the reflection display region, and letting a light that comes to the permeation display region permeate may be performed. With this structure, it is possible to display an image to be viewed from the front by emitting alight toward the front from the predetermined region in each of the plurality of pixels of the liquid crystal display element and to display an image to be viewed from the back by emitting a light toward the back from the region other than the predetermined region in each of the plurality of pixels regardless of whether the display is performed by using a light from the surface light source or by using an external light.

The reflection/permeation means may be constituted by a polarized light separating element (15) which reflects, of two different polarized components of an incident light, one polarized component, and lets the other polarized component permeate the reflection/permeation means.

Further, it is preferred that at least one retardation plate (18, 19) is arranged between the pair of polarizing plates (16, 17), and a scattering layer (20) is arranged between the other polarizing plate (16) and the first substrate (3) or the second substrate (4) on a side of the other polarizing plate (16).

It is preferred that the liquid crystal display element of this liquid crystal display device comprises a liquid crystal layer (5) in which a part that corresponds to the reflection display region is thinner than a part that corresponds to the permeation display region. With this structure, it is possible to unify display characteristics such as contrast between reflection display and permeation display.

A portable apparatus according to a third aspect of the present invention comprises:

a liquid crystal display device including:

a first substrate (3) and a second substrate (4) which are arranged so as to oppose to each other;

a at least one first electrode (6) which is formed on one of opposing internal surfaces of the first substrate (3) and the second substrate (4);

a plurality of second electrodes (7) which are formed on the other of the opposing internal surfaces of the first substrate (3) and the second substrate (4), and which forms a plurality of pixels (80) arranged in a matrix in an area opposing to the first electrode (6) on the one internal surface;

a liquid crystal layer (5) which is sealed in a predetermined gap between the first substrate (3) and the second substrate (4);

a pair of polarizing plates (16, 17) which are arranged so as to sandwich the first substrate (3) and the second substrate (4);

reflection/permeation means which is provided between the liquid crystal layer (5) and one of the pair of polarizing plates (16, 17), and which reflects apart of a light coming to each of the plurality of pixels (80) defined by the first electrode (6) and the second electrodes (7) and lets the other part of the light permeate the reflection/permeation means; and a surface light source (25) which is arranged so as to oppose to the other of the pair of polarizing plates (16, 17), and which emits a light toward the opposing other polarizing plate (16), and les lights coming to the surface light source (25) from a side of the opposing other polarizing plate (16) and from a side opposing to this side permeate the surface light source (25), and a body which is provided with display windows on its two opposing external surfaces, and inside which the liquid crystal display device is accommodated, wherein the liquid crystal display device is accommodated in the body such that a front surface of the liquid crystal display device is faced with the display window on one of the two external surfaces, and a back surface of the liquid crystal display device is faced with the display window on the other of the two external surfaces.

This portable apparatus can be applied to any of a portable phone, a digital camera, a personal computer, and a video camera.

According to this portable apparatus, since the liquid crystal display device performs both surface display with the use of one liquid crystal display element, the occupation area and volume required by the liquid crystal display device inside the portable apparatus is only the occupation area and volume of approximately one liquid crystal display element. Accordingly, this portable apparatus can be miniaturized. Further, images to be displayed on both surfaces can be displayed in a sufficiently large screen size.

Further, since the liquid crystal display device displays an image to be viewed from the front and an image to be viewed from the back in a display manner using a light from the surface light source and in a display manner using an external light, this portable apparatus can display the images to be displayed on both surfaces in a display manner using a light from the surface light source of the liquid crystal display device and in a display manner using an external light.

This portable apparatus of the present invention can be miniaturized by providing display windows to two opposing external surfaces of the portable apparatus respectively, and mounting the liquid crystal display device of the present invention inside the portable apparatus such that the front surface of the liquid crystal display device faces the display window on one of the two external surfaces and the back surface of the liquid crystal display device faces the display window on the other of the two external surfaces. Further, this portable apparatus can display both images to be viewed from the front and the back in a sufficiently large screen size, and can display images on both surfaces in a display manner using a light from the surface light source of the liquid crystal display device and in a display manner using an external light.

BRIEF DESCRIPTION OF DRAWINGS

These objects and other objects and advantages of the present invention will become more apparent upon reading of the following detailed description and the accompanying drawings in which.

BEST MODE FOR CARRYING OUT THE INVENTION

Liquid crystal display devices will be described below as embodiments of the present invention with reference to the accompanying drawings.

First Embodiment

Figure 1:
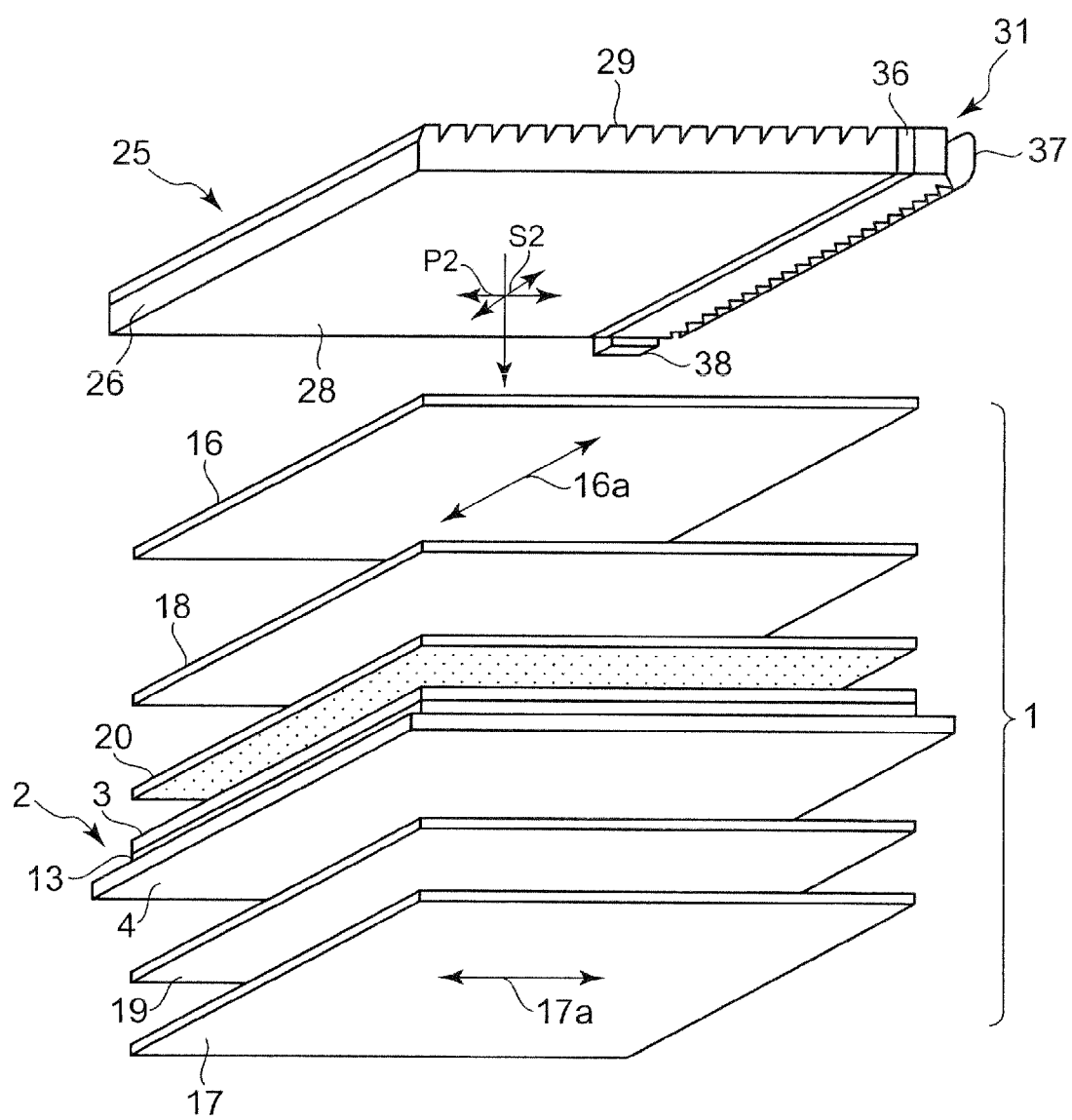
FIG. 1 is an exploded perspective view of a liquid crystal display device according to a first embodiment of the present invention.
Figure 2:
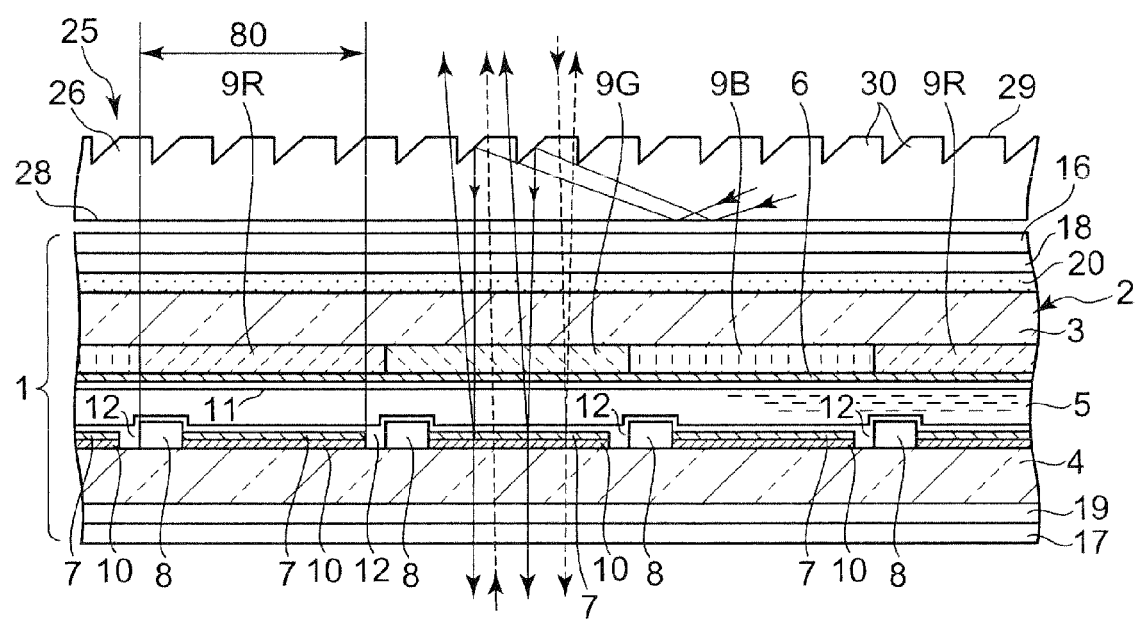
FIG. 2 is a fragmentary sectional view of the liquid crystal display device shown in FIG. 1.

An embodiment of a liquid crystal display device of the present invention will now be explained below. FIG. 1 to FIG. 5 show a liquid crystal display device according to a first embodiment of the present invention. FIG. 1 is an exploded perspective view of the liquid crystal display device, and FIG. 2 is a fragmentary sectional view of the liquid crystal display device.

As shown in FIG. 1 and FIG. 2, the liquid crystal display device according to the present embodiment comprises a liquid crystal display element 1, and a surface light source 25 arranged in front (in the upper part in the drawings) of the liquid crystal display element 1 (in the upper part in the drawings).

The liquid crystal display element 1 comprises a liquid crystal cell 2, reflection/permeation means 10 provided at the back (in the lower part in the drawings) of a liquid crystal layer 5 of the liquid crystal cell 2, and a front polarizing plate 16 and a back polarizing plate 17 which are arranged in front of and at the back of the liquid crystal cell 2.

In the liquid crystal cell 2, the liquid crystal layer 5 is provided between a transparent substrate (front substrate) 3 at the front (in the upper part in the drawing) and a transparent substrate (back substrate) 4 at the back (in the lower part in the drawings) which are, as shown in FIG. 2, arranged oppositely from each other. At least one transparent electrode 6 is provided to one of the opposing internal surfaces of the front substrate 3 and back substrate 4, and a plurality of transparent electrodes 7 forming a plurality of pixels 80 arranged in a matrix in the area opposing to the at least one transparent electrode 6 are provided to the other of the internal surfaces of the substrates.

The liquid crystal cell 2 is an active matrix type. The transparent electrode 6 provided to the internal surface of the front substrate 3 is a monolithic-film-like opposing electrode 6, and the transparent electrodes 7 provided to the internal surface of the back substrate 4 are a plurality of pixel electrodes 7 arranged in a row direction and a column direction to form a matrix.

The plurality of pixel electrodes 7 are connected respectively to a plurality of TFTs (Thin Film Transistors) 8 which are provided to the internal surface of the back surface 4 so as to correspond to the pixel electrodes 7. The plurality of TFTs are connected to unillustrated gate lines and data lines which are provided to the internal surface of the back substrate 4.

The liquid crystal cell 2 comprises color filters 9R, 9G, and 9B in plural colors, for example, red, green, and blue, which correspond respectively to the plurality of pixels 80. These color filters 9R, 9G, and 9B are formed on the internal surface of one of the substrates, for example, the front substrate 3, so as to cover the entire area of each pixel 80. The opposing electrode 6 is formed on the color filters 9R, 9G, and 9B.

The reflection/permeation means 10 provided behind the liquid crystal layer 5 of the liquid crystal cell 2 reflects part of a light coming to each of the plurality of pixels 80 from the front side of the liquid crystal cell 2, and allows other lights to permeate therethrough. In the present embodiment, the reflection/permeation means 10 is a half-transparent and half-reflection film which is made of a very thin aluminum alloy film having a film thickness of approximately 0.025 μm or less and which reflects or allows permeation of an incident light with a predetermined reflection ratio and a predetermined permeation ratio. The reflection/permeation means 10 will hereinafter be referred to as a half-transparent and half-reflection film 10.

The half-transparent and half-reflection film 10 is formed on the internal surface of the back substrate 4 of the liquid crystal cell 2 so as to correspond to the entire area of each of the plurality of pixels 80.

The plurality of pixel electrodes 7 are formed on the plurality of half-transparent and half-reflection films 10 corresponding to the plurality of pixels 80 respectively.

In the present embodiment, the pixel electrodes 7 are formed directly upon the half-transparent and half-reflection films 10 as shown in FIG. 2. However, the half-transparent and half-reflection films 10 may be covered with an insulation film, and the pixel electrodes 7 may be formed on the insulation film. In this case, the half-transparent and half-reflection films 10 may be formed as a monolithic film entirely covering the display area where the plurality of pixels 80 are arranged in a matrix.

Aligning films 11 and 12 are provided respectively to the internal surfaces of the front substrate 3 and back substrate 4 of the liquid crystal cell 2 so as to cover the transparent electrode 6 and the transparent electrodes 7.

The front substrate 3 and the back substrate 4 are connected to each other via a frame-like seal member 13 (see FIG. 1) which encloses the display area where the pixels 80 are arranged, and the liquid crystal layer 5 is provided in an area enclosed by the frame-like seal member 13 between the front substrate 3 and the back substrate 4.

Liquid crystal molecules of the liquid crystal layer 5 have their aligning direction near the front and back substrates 3 and 4 defined by the aligning films 11 and 12, and they are oriented in an initial aligning state which is predefined between the front and back substrates 3 and 4.

The polarizing plates 16 and 17 arranged at the front and at the back of the liquid crystal cell 2 are absorptive polarizing plates 16 and 17 which have absorption axes (not illustrated) and permeation axes 16a and 17a in orthogonal directions to each other, absorb, of two linearly-polarized lights orthogonal to each other of an incident light, one polarized light, and let the other polarized light permeate.

The liquid crystal display element 1 of the present embodiment is a TN (Twisted Nematic) type liquid crystal display element of a normally white mode. The liquid crystal molecules of the liquid crystal display 5 of the liquid crystal cell 2 are twist-orientated at a twist angle of substantially 90° between the front and back substrates 3 and 4, and the absorptive polarizing plates 16 and 17 are arranged with their permeation axes 16a and 17a substantially orthogonal to each other.

The liquid crystal display element 1 further comprises retardation plates 18 and 19 which are arranged between the liquid crystal cell 2 and the polarizing plate 16 at the front and between the liquid crystal cell 2 and the polarizing plate 17 at the back, and a light scattering layer (hereinafter referred to as scattering layer) 20 which is arranged between the liquid crystal cell 2 and the retardation plate 18 at the front, in order to improve the display contrast and the view angle.

The surface light source 25 arranged at the front of the liquid crystal display element 1 (at the front of the front polarizing plate 16) emits a light toward the entire display area where the plurality of pixels 80 of the liquid crystal display element 1 are arranged, and allows a light coming thereto from its front and its back to permeate therethrough.

Figure 3:
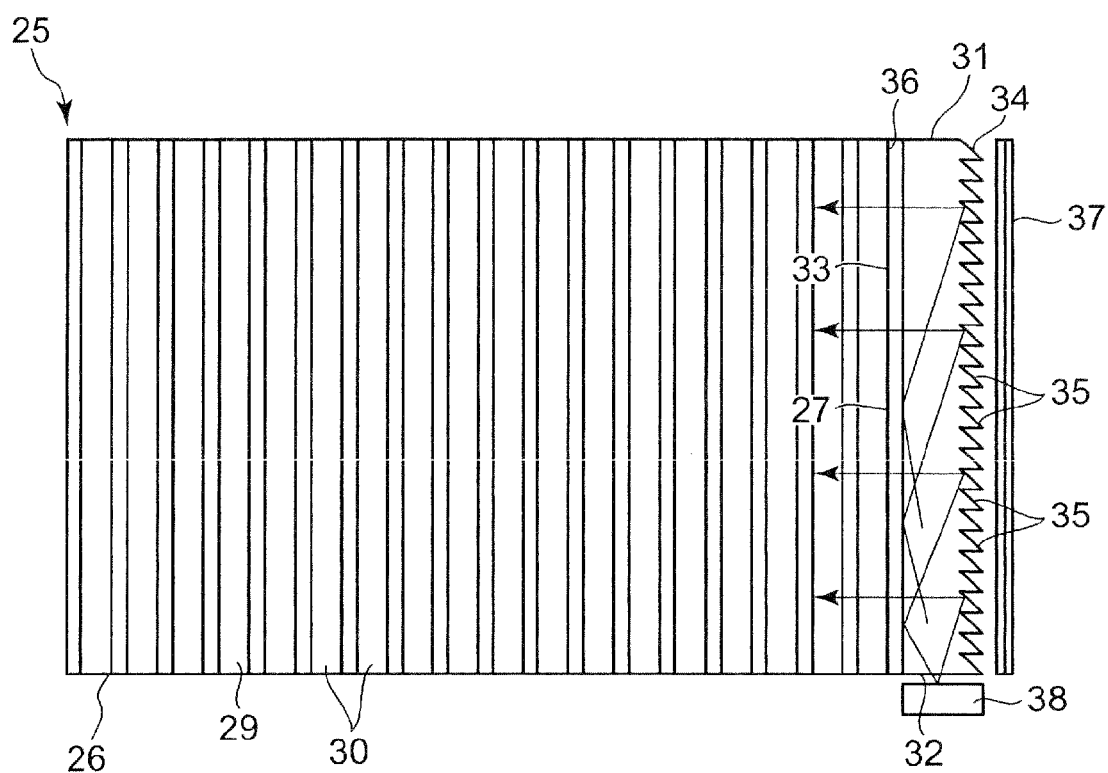
FIG. 3 is a plan view of a surface light source of the liquid crystal display device shown in FIG. 1.
Figure 4:
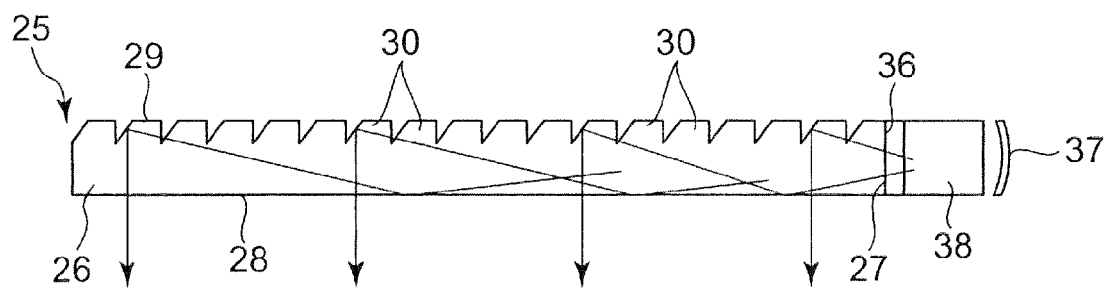
FIG. 4 is a side view of the surface light source shown in FIG. 3.
Figure 5:
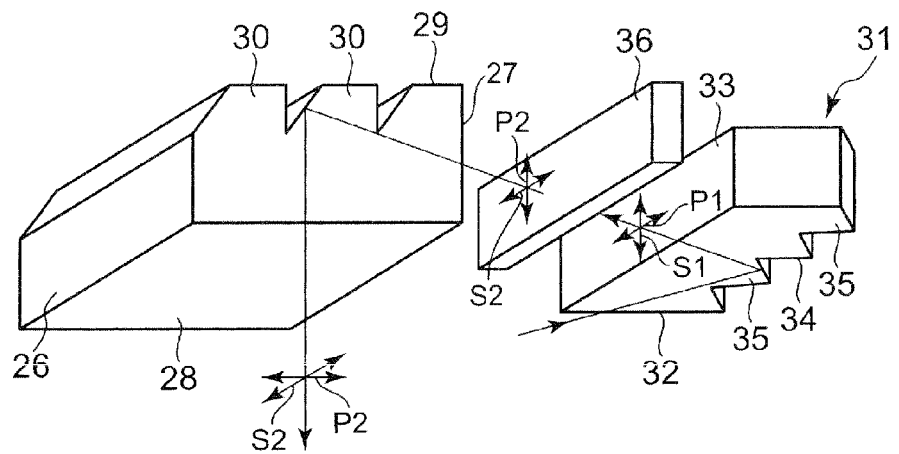
FIG. 5 is an exemplary diagram showing the arrangement of a solid light emitting element, a light guiding member, and a light guiding plate of the surface light source shown in FIG. 3.

FIG. 3 and FIG. 4 are the plan view and the side view of the surface light source 25, and FIG. 5 is an exemplary diagram showing a light emitted from a light guiding member and a light guiding plate of the surface light source 25.

As shown in FIG. 3 and FIG. 4, the surface light source 25 of the present embodiment comprises a light guiding plate 26, a light guiding member 31 arranged at the side of the light guiding plate 26, a retardation plate 36 arranged between the light guiding plate 26 and the light guiding member 31, and a light emitting element 38 arranged at the side of the light guiding member 31.

The light guiding plate 26 is constituted by a transparent plate made of an acryl resin plate having an area opposing to the entire display area of the liquid crystal display element 1. One end surface of the light guiding plate 26 constitutes an incident surface 27 from which a light comes to the light guiding plate 26. One of the two plate surfaces of the transparent plate constituting the light guiding plate 26 constitutes a flat emission surface 28 from which a light guided by the transparent plate is emitted, and the other plate surface constitutes a reflection surface 29 for internally reflecting a light coming from the incident surface 27 so as to be emitted from the emission surface 28.

The reflection surface 29 of the light guiding plate 26 is constituted by a plurality of prism units 30 which are formed densely in parallel with one another side by side over the entire surface of the other plate surface of the light guiding plate 26, and which internally reflect light coming from the incident surface 27 of the light guiding plate 26 in a direction in which an angle to the normal of the emission surface 28 is smaller.

The plurality of prism units 30 are long and slender prism units which are parallel with the incident surface 27 of the light guiding plate 26 and have a length corresponding to the entire width of the light guiding plate 26, and whose cross section has a trapezoidal shape. Of both the side surfaces of each of the prism units 30, the side surface at the side of the incident surface 27 is formed as a steep-angle surface which is approximately perpendicular to the emission surface 28, and the other side surface is formed as an inclined surface which is inclined in the direction of the incident surface 27 toward the external surface of the reflection surface 29 at an angle of 30 to 60 degrees (preferably, approximately 45 degrees) to the emission surface 28. The top surface between these side surfaces (steep-angle surface and inclined surface) is formed as a flat surface parallel with the emission surface 28.

FIG. 3 and FIG. 4 show the plurality of prism units 30 exaggeratedly largely. However, the prism units 30 are formed in a pitch smaller than the pixel pitch of the liquid crystal cell 2.

The light guiding plate 26 is for guiding a light coming from the incident surface 27 so as to be emitted from the emission surface 28. A light coming into the light guiding plate 26 from the incident surface 27 either goes straight in the light guiding plate 26 as shown by arrows in FIG. 3, or is internally reflected on the emission surface 28 by total internal reflection at the interface with the external air (atmosphere) to come into any of the inclined surfaces of the plurality of long and slender prism units 30 of the reflection surface 29, and to be internally reflected on the inclined surface by total internal reflection at the interface with the external air toward a direction in which an angle to the normal of the emission surface 28 is smaller and then emitted from the emission surface 28.

The light guiding member 31 arranged at the side of the light guiding plate 26 is made of a slender transparent material (for example, acryl resin) having a square stick shape having a length corresponding to the incident surface 27 of the light guiding plate 26. One side surface of the light guiding member 31 forms a slender emission surface 33 for emitting a light. One of two end surfaces intersecting with the slender emission surface 33 of the slender transparent material forms an incident surface 32 from which a light comes to the slender transparent material. The other side surface that is opposing to the slender emission surface 33 forms a reflection surface 34 for internally reflecting a light coming from the incident surface 32 so as to be emitted from the slender emission surface 33.

The reflection surface 34 at the other side surface of the light guiding member 31 is constituted by a plurality of prism units 35 which are formed densely in parallel with one another side by side over the entire surface of the other side surface, and which internally reflect a light coming from the incident surface 32 of the light guiding member 31 toward a direction in which an angle to the normal of the slender emission surface 33 at the one side surface of the light guiding member 31 is smaller.

The plurality of prism units 35 are slender prism units which are parallel with the incident surface 32 of the light guiding member 31 and have a length corresponding to the entire width of the other side surface of the light guiding member 31, and whose cross section has a triangular shape. Of both the side surfaces of each of the prism units 35, the side surface at the side of the incident surface 32 is formed as a steep-angle surface which is approximately perpendicular to the slender emission surface 33, and the other side surface is formed as an inclined surface which is inclined in the direction of the incident surface 32 toward the external surface of the reflection surface 34 at an angle of 30 to 60 degrees (preferably, approximately 45 degrees) to the slender emission surface 33.

FIG. 3 shows the plurality of prism units 35 exaggeratedly largely. However, the prism units 35 are actually formed in a pitch approximately the same as the pitch of the prism units 30 on the reflection surface 29 of the light guiding plate 26.

The light guiding member 31 is for guiding a light coming from the incident surface 32 to be emitted from the slender emission surface 33 at the one side surface of the light guiding member 31. A light coming into the light guiding member 31 from the incident surface 32 either goes straight in the light guiding member 31 as shown by arrows in FIG. 3, or is internally reflected on the slender emission surface 33 by total internal reflection at the interface with the external air so as to come to any of the inclined surfaces of the plurality of prism units 35 of the reflection surface 34, and to be internally reflected on the inclined surface by total internal reflection at the interface with the external air toward a direction in which an angle to the normal of the slender emission surface 33 is smaller, and then to be emitted from the entire surface of the slender emission surface 33 with a uniform distribution of intensity.

The light guiding member 31 has its slender emission surface 33 opposing to the incident surface 27 of the light guiding plate 26, such that the slender emission surface 33 of the light guiding member 31 and the incident surface 27 of the light guiding plate 26 are arranged in parallel with each other.

In the present embodiment, a reflector 37 is provided behind the reflection surface 34 of the light guiding member 31, in order to return a light permeating the reflection surface 34 and leaking behind the light guiding member 31 back to the light guiding member 31.

The retardation plate 36 arranged between the light guiding plate 26 and the light guiding member 31 is a $\lambda/2$ retardation plate for providing a phase difference of ½ of a wavelength between a normal light and an abnormal light of a permeation light. The retardation plate 36 rotates the polarization plane of a linearly-polarized component of a light emitted from the slender emission surface 33 of the light guiding member 31 by substantially 90 degrees, and then lets the light come to the incident surface 27 of the light guiding plate 26.

The λ/2 retardation plate 36 has a slender shape corresponding to the entire incident surface 27 of the light guiding plate 26 and the entire slender emission surface 33 of the light guiding member 31. The λ/2 retardation plate 36 is arranged between the incident surface 27 of the light guiding plate 26 and the slender emission surface 33 of the light guiding member 31 with one surface adhered to the incident surface 27 of the light guiding plate 26 by a transparent adhesive agent and the other surface adhered to the slender emission surface 33 of the light guiding member 31 by a transparent adhesive agent.

The light emitting element 38 arranged so as to oppose to the incident surface 32 of the light guiding member 31 is a solid light emitting element 38 which is constituted by an LED (Light Emitting Diode) and which emits a white light. For example, a red LED, a green LED, and a blue LED are molded by a transparent resin to constitute the solid light emitting element 38, and a white light made by mixing red, green, and blue lights emitted from these LEDs is emitted from the solid light emitting element 38.

In the surface light source 25, a light emitted from the solid light emitting element 38 comes into the light guiding member 31 from the incident surface 32, is internally reflected on the reflection surface 34 opposite to the slender emission surface 33 of the light guiding member 31 to be emitted from the entire slender emission surface 33 of the light guiding member 31 with a uniform distribution of intensity toward the incident surface 27 of the light guiding plate 26, and then comes to the entire incident surface 27 of the light guiding plate 26 while keeping the uniform distribution of intensity so as to be internally reflected on the reflection surface 29 of the light guiding plate 26 and emitted from the entire emission surface 28 of the light guiding plate 26. With this surface light source 25, a light having a uniform distribution of strength can be emitted from the entire emission surface 28 of the light guiding plate 26 by using a small number of light emitting element.

Further, in the surface light source 25, a light emitted from the slender emission surface 33 of the light guiding member 31 comes into the incident surface 27 of the light guiding plate 26 after the polarization plane of a linearly-polarized component of the light is rotated by substantially 90 degrees by the λ/2 retardation plate 36 arranged between the incident surface 27 of the light guiding plate 26 and the slender emission surface 33 of the light guiding member 31. Therefore, of a light coming into the light guiding member 31 from the incident surface 32 to be internally reflected on the reflection surface 34 of the light guiding member 31 and emitted from the slender emission surface 33 of the light guiding member 31 and coming into the light guiding plate 26 from the incident surface 27, a linearly-polarized component having a high intensity can be internally reflected on the reflection surface 29 of the light guiding plate 26 with a high reflection intensity and can be emitted from the emission surface 28 of the light guiding plate 26 as a light having a sufficient intensity.

As described above, the light guiding plate 26 lets a light coming from the incident surface 27 go straight in the light guiding plate 26 or be internally reflected on the emission surface 28 to come to the reflection surface 29 to be internally reflected on the reflection surface 29 and emitted from the emission surface 28. A linearly-polarized component that vibrates in the direction perpendicular to a plane including the incident light to the reflection surface 29 and its reflection light (such a component will hereinafter be referred to as S wave) is internally reflected with a higher intensity than that for a linearly-polarized component that vibrates within the plane (hereinafter referred to as P wave).

Further, as described above, the light guiding member 31 lets a light coming from the incident surface 32 be internally reflected on the reflection surface 34 to be emitted from the slender emission surface 33. An S wave, which is a linearly-polarized component vibrating in the direction perpendicular to a plane including the incident light to the reflection surface 34 and its reflection light is internally reflected with a higher intensity than that for a P wave, which is a linearly-polarized component vibrating within the plane.

Accordingly, of the light emitted from the slender emission surface 33 of the light guiding member 31, the intensity of the S-wave polarized component is higher than that of the P-wave polarized component.

Since the reflection surface 29 of the light guiding plate 26 and the reflection surface 34 of the light guiding member 31 are arranged so as to intersect with each other at an angle of 90 degrees, a light emitted from the slender emission surface 33 of the light guiding member 31 is let to come into the light guiding plate 26 from the incident surface 27 after its polarization plane is rotated by 90 degrees by the λ/2 retardation plate 36.

Accordingly, of a light emitted from the slender emission surface 33 of the light guiding member 31, an S wave S1 having a high intensity comes to the reflection surface 29 of the light guiding plate 26 as an S wave S2 which is to be reflected by the reflection surface 29 with a high reflection intensity. Thus, the surface light source 25 can let a polarized component having a high light intensity that is emitted from the slender emission surface 33 of the light guiding member 31 be internally reflected on the reflection surface 29 of the light guiding plate 26 with a high reflection intensity, and thus can let a light having a sufficient intensity be emitted from the emission surface 28 of the light guiding plate 26.

Since the surface light source 25 comprises the light guiding plate 26 in which one end surface of a transparent plate forms the incident surface 27 from which a light comes, one of two plate surfaces of the transparent plate forms the emission surface 28 for emitting a light guided in the transparent plate, and the other plate surface forms the reflection surface 29 for internally reflecting a light coming from the incident surface 27 to be emitted from the emission surface 28, and the light guiding member 31 for guiding a light from the solid light emitting element 38 toward the incident surface 27 of the light guiding plate 26, a light having a sufficient intensity can be emitted from the entire emission surface 28 of the light guiding plate 26 with a uniform distribution of intensity.

Since the surface light source 25 of the present embodiment comprises only one solid light emitting element 38 constituted by an LED as a light emitting element, it is possible to reduce the cost required, and reduce the amount of electricity to be consumed.

Further, since the light emitting intensity of the solid light emitting element 38 can be changed by controlling the drive voltage for the solid light emitting element 38, it is possible to arbitrary adjust the intensity of a light to be emitted from the emission surface 28 of the light guiding plate 26.

Further, in the surface light source 25, the reflection surface 34 of the light guiding member 31 is constituted by the plurality of prism units 35 for internally reflecting a light coming from the incident surface 32 of the light guiding member 31 toward a direction in which an angle to the normal of the slender emission surface 33 of the light guiding member 31 is smaller, it is possible to let a light emitted from the slender emission surface 33 of the light guiding member 31 come into the light guiding plate 26 from around a direction perpendicular to the incident surface 27 and let the light prevail uniformly in the light guiding plate 26 to be emitted from the entire emission surface 28 of the light guiding plate 26 as a light having a more uniform distribution of intensity.

Further, in the surface light source 25, the reflection surface 29 of the light guiding member 26 is constituted by the plurality of prism units 30 for internally reflecting a light coming from the incident surface 27 of the light guiding plate 26 toward a direction in which an angle to the normal of the emission surface 28 of the light guiding plate 26 is smaller, a light having a high frontal luminance (the luminance of a light emitted in a direction near the normal of the emission surface 28 of the light guiding plate 26) can be emitted from the emission surface 28 of the light guiding plate 26.

The liquid crystal display device of the present embodiment performs display by letting a light from the surface light source 25 come to the liquid crystal display element 1 from its front surface. A light emitted from the emission surface 28 of the light guiding plate 26 of the surface light source 25 is polarized by the front polarizing plate 16 of the liquid crystal display element 1 to be a linearly-polarized light parallel with the permeation axis 16a as shown by arrows in FIG. 2, permeates the front retardation plate 18 to be scattered by the scattering layer 20, and comes to the liquid crystal cell 20 from its front.

The light coming to the liquid crystal cell 20 from its front is colored by the color filters 9R, 9G, and 9B corresponding to the respective pixels 80 of the liquid crystal cell 2 and comes to the liquid crystal layer 5. While permeating the liquid crystal layer 5, this light is subjected to a birefringence effect corresponding to the aligning state of the liquid crystal molecules that is changed by an electric field applied between the transparent electrode 6 and the transparent electrode 7 of each pixel 80, and then comes to the half-transparent and half-reflection film 10 on the internal surface of the back substrate 4 of the liquid crystal cell 2. Part of the light coming to the half-transparent and half-reflection film 10 is reflected by the half-transparent and half-reflection film 10 in accordance with its reflection ratio, and the rest of the light permeates the half-transparent and half-reflection film 10.

The light reflected by the half-transparent and half-reflection film 10 again permeates the liquid crystal layer 5 and the color filters 9R, 9G, and 9B to be emitted to the front of the liquid crystal cell 2 and scattered by the scattering layer 20, and permeates the front retardation plate 18 to come to the front polarizing plate 16. Of this light, a polarized component parallel to the permeation axis 16a of the front polarizing plate 16 permeates the front polarizing plate 16 and also permeates the light guiding plate 26 of the surface light source 25 to be emitted to the front of the surface light source 25, and a polarized component parallel to the absorption axis of the front polarizing plate 16 is absorbed into the front polarizing plate 16, thereby an image to be viewed from the front is displayed.

On the other hand, of the light coming to the liquid crystal cell 2 from its front, the light permeating the half-transparent and half-reflection film 10 is emitted toward the back of the liquid crystal cell 2. The light emitted toward the back of the liquid crystal cell 2 permeates the back retardation plate 19 and comes to the back polarizing plate 17. Of the light coming to the back polarizing plate 17, a polarized component parallel to the permeation axis 17a of the back polarizing plate 17 permeates the back polarizing plate 17 to be emitted to the back, and a polarized component parallel to the absorption axis of the back polarizing plate 17 is absorbed into the back polarizing plate 17, thereby an image to be viewed from the back is displayed.

In the present embodiment, since the liquid crystal display element 1 is a normally white mode type, both of the image to be viewed from the front and the image to be viewed from the back are color images in which, a light emitted from a non-electric-field pixel (a pixel whose liquid crystal molecules are in an initial aligning state) that is sandwiched between the transparent electrodes 6 and 7 between which no electric field is applied permeates the front and back polarizing plates 16 and 17 to be emitted to the front and back and displayed as bright display having any of red, green, and blue colors, and a light emitted from an electric-field-applied pixel that is sandwiched between the transparent electrodes 6 and 7 between which an electric field by which liquid crystal molecules are oriented to stand substantially perpendicularly to the front and back substrates 3 and 4 is applied, is absorbed into the front and back polarizing plates 16 and 17 to be displayed as dark display having a black color.

That is, the present liquid crystal display device lets a light from the surface light source 25 arranged in front of the liquid crystal display element 1 come to the liquid crystal display element 1, lets a part of the light coming to the plurality of pixels 80 of the liquid crystal cell 2 from the front of the liquid crystal display element 1 be reflected on the half-transparent and half-reflection film 10 and emitted toward the front of the surface light source 25 so that an image to be viewed from the front will be displayed, and lets the other part of the light permeate the half-transparent and half-reflection film 10 to be emitted toward the back of the liquid crystal display element 1 so that an image to be viewed from the back will be displayed.

Since the present liquid crystal display device displays an image to be viewed from the front by reflecting a part of a light coming to the plurality of pixels 80 of the liquid crystal cell 2 from the front of the liquid crystal display element 1 and displays an image to be viewed from the back by allowing the other part of the light to permeate, it can display both of the image to be viewed from the front and the image to be viewed from the back by using the entire display area (an area where the plurality of pixels 80 of the liquid crystal cell 2 are arranged in a matrix) of the liquid crystal display element 1. Accordingly, the display area of the liquid crystal display element 1 needs only to have a size corresponding to the display screen for either front display or back display.

Therefore, according to the present liquid crystal display device, it is possible to achieve both surface display by using only one liquid crystal display element 1, and to reduce the occupation area of the liquid crystal display device in a case where the liquid crystal display device is mounted on an apparatus, to an area approximately the same as the display screen for only either front display or back display.

Further, since the present liquid crystal display device is structured by arranging one surface light source 25 in front of the liquid crystal display element 1, it is possible to reduce the occupation area and volume of the liquid crystal display device in an apparatus, to approximately the area and volume of the liquid crystal display element 1.

Further, since the present liquid crystal display device is structured such that the liquid crystal display element 1 includes the liquid crystal cell 2 and the half-transparent and half-reflection film 10 which is provided behind the liquid crystal layer 5 for reflecting a part of a light coming to the plurality of pixels 80 from the front of the liquid crystal cell 2 and letting the other part of the light permeate the half-transparent and half-reflection film 10, and the surface light source 25 for emitting a light toward the entire display area where the plurality of pixels 80 of the liquid crystal display element 1 are arranged and letting lights coming from the front and back permeate the surface light source 25 is arranged in front of the liquid crystal display element 1, it is possible to, as shown by broken arrows in FIG. 2, let an external light (a light in an external environment) coming from the front of the surface light source 25 permeate the surface light source 25 to come into the liquid crystal cell 2, let a part of this light that is reflected on the half-transparent and half-reflection film 10 be emitted toward the front of the surface light source 25, let the other part of this light that permeates the half-transparent and half-reflection film 10 be emitted toward the back of the liquid crystal display element 1, and let an external light coming from the back of the liquid crystal display element 1 permeate the half-transparent and half-reflection film 10, the liquid crystal cell 2, and the surface light source 25 to be emitted toward the front.

Accordingly, the present liquid crystal display device can display an image to be viewed from the front by reflection display using a light from the surface light source 25, by reflection display using an external light coming from the front of the surface light source 25, and by permeation display using an external light coming from the back of the liquid crystal display element 1, and can display an image to be viewed from the back by permeation display using a light from the surface light source 25 and by permeation display using an external light coming from the front of the surface light source 25.

In case of display using an external light, an image to be viewed from the front is displayed by both of reflection of an external light coming from the front and permeation of an external light coming from the back in an environment where the liquid crystal display device has an external light coming thereto from both of its front and its back, and is displayed by reflection of an external light coming from the front in an environment where an external light does not come to the liquid crystal display device from its back.

Further, in case of display using an external light, if the intensity of an external light that comes to the liquid crystal display device is insufficient and thus a display having sufficient brightness can not be obtained, the surface light source 25 can be used as an auxiliary light source, so that a light having an intensity supplementing the intensity of the external light will be emitted from the surface light source 25 and thereby a display having sufficient brightness will be obtained.

As described above, the present liquid crystal display device is structured such that the surface light source 25 that emits a light toward the liquid crystal display element 1 and lets lights coming from its front and back permeate therethrough is arranged in front of the liquid crystal display element 1 including the liquid crystal cell 2 and the half-transparent and half-reflection film 10 which is provided behind the liquid crystal layer 5 for reflecting a part of a light coming from the front of the liquid crystal cell 2 to the plurality of pixels 80 and letting the other part of the light permeate the half-transparent and half-reflection film 10. Accordingly, it is possible to obtain both surface display with the use of one liquid crystal display element 1, to reduce the occupation area and volume of the liquid crystal display device, and to display an image to be viewed from the front and an image to be viewed from the back in a display manner using a light from the surface light source 25 and in a display manner using an external light which is a light in the external environment.

Further, since the present liquid crystal display device is provided, behind the liquid crystal layer 5 of the liquid crystal cell 2 of the liquid crystal display element 1, with the half-transparent and half-reflection film 10 that reflects an incident light or lets this incident light permeate therethrough with a predetermined reflection ratio and a predetermined permeation ratio as reflection/permeation means, it is possible to let a light be emitted toward the front and back from the entire area of the plurality of pixels 80 of the liquid crystal cell 2, and to display both of an image to be viewed from the front and an image to be viewed from the back by using the entire area of the plurality of pixels 80 of the liquid crystal cell 2 regardless of whether the display is performed by using a light from the surface light source 25 or by using an external light.

Further, the present liquid crystal display device is provided, between the liquid crystal cell 2 of the liquid crystal display device 1 and the front polarizing plate 16 and between the liquid crystal cell 2 and the back polarizing plate 17, with the retardation plates 18 and 19 for improving the display contrast and the view angle, and is provided, between the liquid crystal cell 2 and the front retardation plate 18, with the scattering layer 20, it is possible to emit a light which is scattered by the scattering layer 20 and thereby has a uniform distribution of luminance toward the front and the back. Accordingly, both of an image to be viewed from the front and an image to be viewed from the back can be a high quality image having a sufficient contrast and a sufficient view angle, and having no unevenness in the luminance.

In the present embodiment, the scattering layer 20 is arranged between the liquid crystal cell 2 and the front retardation plate 18. However, the scattering layer 20 may be arranged between the front polarizing plate 16 and the front retardation plate 18.

Second Embodiment

Figure 6:
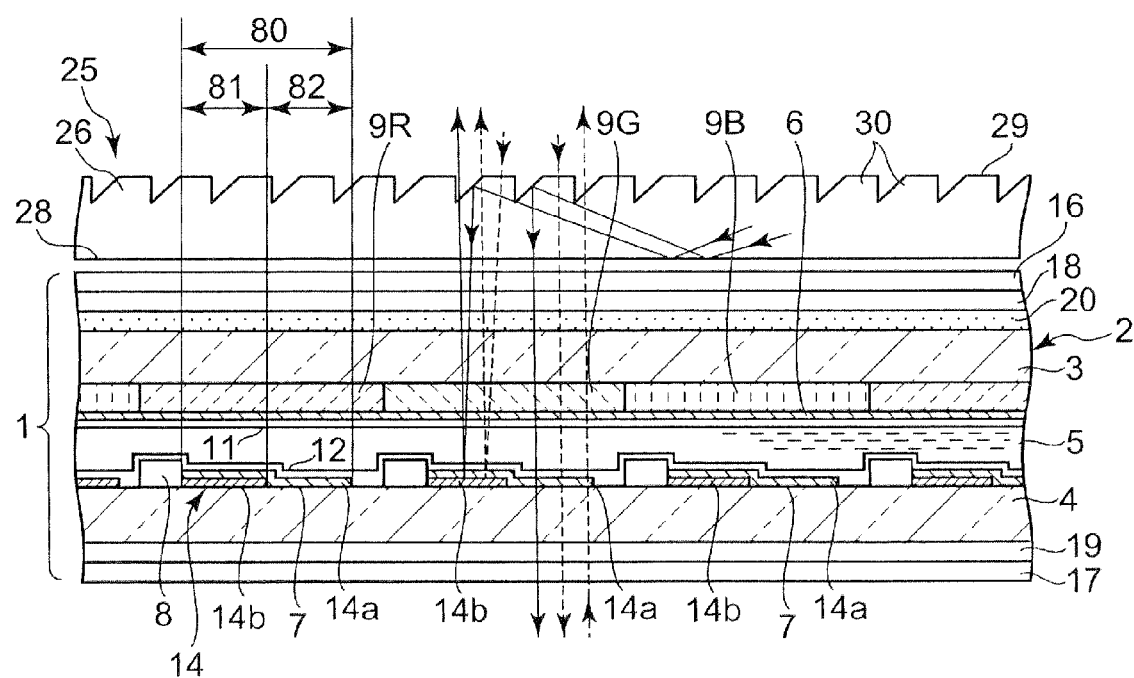
FIG. 6 is a fragmentary sectional view of a liquid crystal display device according to a second embodiment of the present invention.

FIG. 6 is a fragmentary sectional view of a liquid crystal display device according to a second embodiment of the present invention. The liquid crystal display element 1 of the liquid crystal display device of the present embodiment is provided with a reflection film 14 as reflection/permeation means behind the liquid crystal layer 5 of the liquid crystal cell 2. The reflection film 14 has open portions 14a each of which is formed in a region 82 defined in each of a plurality of pixels 80 of the liquid crystal cell 2, and reflection portions 14b each of which is formed in another region 81 defined in each of the plurality of pixels 80. The reflection film 14 is a partial reflection/permeation layer 14 which reflects, of a light coming to each of the plurality of pixels 80, a light that comes to the reflection portions 14b, and lets a light that comes to the open portions 14a permeate therethrough. In the present embodiment, it is preferable that the reflection film 14 be a single-sided reflection film in which a low reflection treatment is applied to the surface opposite to the surface facing the liquid crystal layer 5, and a specular surface treatment is applied to the surface facing the liquid crystal layer 5. The reflection film 14 is formed on the internal surface of the back substrate 4 of the liquid crystal cell 2 to be fitted to approximately ½ of the area of each of the pixels 80 arranged in a matrix. Each of the plurality of pixel electrodes 7 is formed with its one part (approximately ½ of each pixel electrode 7) overlaid directly upon the reflection film 14 or, if the reflection film 14 is covered with a transparent insulation film, upon this transparent insulation film.

Since the liquid crystal display device of the present embodiment is the same as the liquid crystal display device of the first embodiment, except that the partial reflection/permeation layer 14 replaces the half-transparent and half-reflection film 10 of the first embodiment as the reflection/permeation means provided behind the liquid crystal layer 5 of the liquid crystal cell 2, the same components as those in the first embodiment will be denoted by the same reference numerals and the explanation for such components will be omitted.

The present liquid crystal display device lets one or both of a light from the surface light source 25 and an external light coming from the front of the surface light source 25 come to the liquid crystal display element 1 from its front, and lets a part of the light coming to each of the plurality of pixels 80 of the liquid crystal cell 2, i.e. a light that comes to the region (reflection display region) 81 within each of the plurality of pixels 80 that corresponds to the reflection portion 14b of the reflection film 14 be reflected by the reflection portion 14b and emitted toward the front, and lets the other part of the light, i.e. a light that comes to the region (permeation display region) 82 within each of the plurality of pixels 80 that corresponds to the open portion 14a of the reflection film 14 permeate the open portion 14a to be emitted toward the back.

Further, if an external light comes to the liquid crystal display element 1 also from its back, the present liquid crystal display device lets a light, of the light coming from the back, that permeates the open portion 14a and comes to each of the plurality of pixels 80 of the liquid crystal cell 2 be emitted toward the front.

That is, the present liquid crystal display device displays an image to be viewed from the front by using one or both of a light that comes to the plurality of pixels 80 of the liquid crystal cell 2 from the front of the liquid crystal display element 1 (this light including one or both of a light from the surface light source 25 and an external light coming from the front of the surface light source 25) and then is reflected by the reflection portion 14b, and a light (an external light coming from the back of the liquid crystal display element 1) that comes to the plurality of pixels 80 of the liquid crystal cell 2 after permeating the open portion 14a from the back of the liquid crystal display element 1, and displays an image to be viewed from the back by using a light that comes to the plurality of pixels 80 of the liquid crystal cell 2 from the front and permeates the open portion 14a.

Accordingly, with the present liquid crystal display device, likewise the liquid crystal display device of the first embodiment, it is possible to obtain both surface display with the use of one liquid crystal display element 1, to reduce the occupation area and volume of the liquid crystal display device, and to display both of an image to be viewed from the front and an image to be viewed from the back in a display manner using a light from the surface light source 25 and in a display manner using an external light which is a light in the external environment.

Since the present liquid crystal display device comprises, as the reflection/permeation means, the reflection film 14 which is formed behind the liquid crystal layer 5 of the liquid crystal cell 2 of the liquid crystal display element 1 so as to correspond to the regions 81 and 82 of each of the plurality of pixels 80 of the liquid crystal cell 2, and lets a light, of a light coming to each of the plurality of pixels 80, that comes to the reflection portion 14b be reflected thereon, and a light that comes to the open portion 14a permeate therethrough, it is possible to display an image to be viewed from the front by letting a light be emitted toward the front from the predetermined region 81 within each of the plurality of pixels 80 of the liquid crystal cell 2, and display an image to be viewed from the back by letting a light be emitted toward the back from the other region 82 within each of the plurality of pixels 80 regardless of whether the display is performed by using a light from the surface light source 25 or by using an external light.

A part of the liquid crystal layer 5 that corresponds to the reflection display region 81 is thinner than a part of the liquid crystal layer 5 that corresponds to the permeation display area 82. Due to this, it is possible to unify display characteristics such as contrast between reflection display and permeation display.

In the present embodiment, the reflection portion 14b is formed so as to correspond to ½ of the area of each of the plurality of pixels 80 of the liquid crystal cell 2. However, the shapes of the reflection portion 14b and open portion 14a and the area ratio between them may be arbitrary. Further, the reflection portion 14b and the open portion 14a may be formed in one pixel 80 in plural numbers respectively.

Third Embodiment

Figure 7:
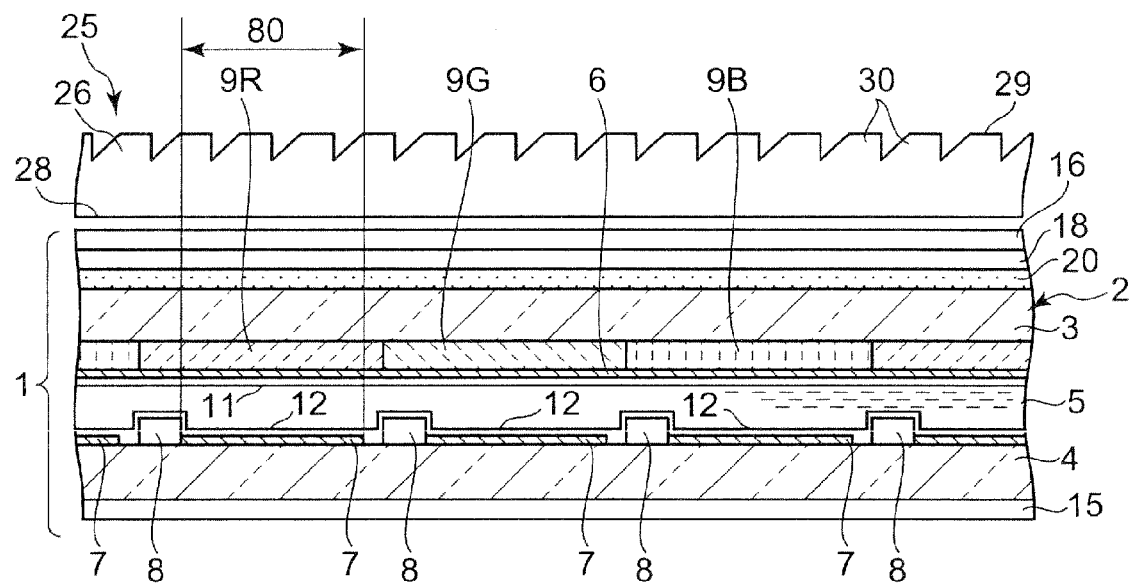
FIG. 7 is a fragmentary sectional view of a liquid crystal display device according to a third embodiment of the present invention.

FIG. 7 is a fragmentary sectional view of a liquid crystal display device according to a third embodiment of the present invention. The liquid crystal display element 1 of the liquid crystal display device of the present embodiment is provided as reflection/permeation means, behind the liquid crystal layer 5 of the liquid crystal cell 2, with a polarized light separating element 15 for reflecting, of two different polarized components of an incident light, one polarized component, and letting the other polarized component permeate therethrough.

In the present embodiment, the polarized light separating element 15 is a reflecting/polarizing element for reflecting, of two linearly-polarized components orthogonal to each other of an incident light, one polarized component, and letting the other polarized component permeate therethrough. In the present embodiment, a reflecting/polarizing plate which has a permeation axis and a reflection axis (both not illustrated) in orthogonal directions to each other, and which reflects, of two linearly-polarized components orthogonal to each other of an incident light, one polarized component having a vibration surface parallel to the reflection axis and lets the other polarized component having a vibration surface parallel to the permeation axis permeate therethrough, is used as the polarized light separating element 15. The polarized light separating element 15 will hereinafter be referred to as reflecting/polarizing plate.

In the present embodiment, the reflecting/polarizing plate 15 is arranged at the back of the back substrate 4 of the liquid crystal cell 2, and the back polarizing plate (absorptive polarizing plate) 17 which is arranged at the back portion of the liquid crystal display element 1 in the first and second embodiments is omitted. Further, the back retardation plate 19 which is arranged at the back portion of the liquid crystal display element 1 in the first and second embodiments is also omitted.

The liquid crystal display element 1 of the present embodiment is a TN type liquid crystal display element whose display to be viewed from the front is in a normally white mode, and the reflecting/polarizing plate 15 is arranged such that its permeation axis is substantially parallel with the permeation axis 16a of the absorptive polarizing plate 16 which is arranged at the front of the liquid crystal cell 2, and its reflection axis is substantially orthogonal to the permeation axis 16a of the absorptive polarizing plate 16.

The liquid crystal display device of the present embodiment is the same as the liquid crystal display device of the first embodiment, except that the reflection/permeation means behind the liquid crystal layer 5 of the liquid crystal cell 2 is the reflecting/polarizing plate 15 which serves also as a back polarizing plate. Therefore, the same components as those in the first embodiment are denoted by the same reference numerals and explanation of such components will be omitted.

The present liquid crystal display device lets one or both of a light from the surface light source 25 and an external light coming from the front of the surface light source 25 come to the liquid crystal display element 1 from its front, lets a part of the light coming to each of the plurality of pixels 80 of the liquid crystal cell 2, i.e. a polarized component parallel with the reflection axis of the reflecting/polarizing plate 15 arranged at the back of the liquid crystal cell 2 be reflected by the reflecting/polarizing plate 15 and emitted toward the front, and lets the other part of the light, i.e. a polarizing component parallel with the permeation axis of the reflecting/polarizing plate 15 permeate the reflecting/polarizing plate 15 to be emitted toward the back.

In a case where an external light comes to the liquid crystal display element 1 also from its back, the present liquid crystal display element 1 lets a part of the light coming from the back, that permeates the reflecting/polarizing plate 15 and comes to the plurality of pixels 80 of the liquid crystal cell 2 be emitted toward the front.

That is, the present liquid crystal display device displays an image to be viewed from the front by using one or both of a light that comes to each of the plurality of pixels 80 of the liquid crystal cell 2 from the front of the liquid crystal display element 1 (this light including one or both of a light from the surface light source 25 and an external light coming form the front of the surface light source 25) and is reflected by the reflecting/polarizing plate 15 and a light (an external light coming from the back of the liquid crystal display element 1) that permeates the reflecting/polarizing plate 15 from the back of the liquid crystal display element 1 and comes to each of the plurality of pixels 80 of the liquid crystal cell 2, and displays an image to be viewed from the back by using a light that comes to each of the plurality of pixels 80 of the liquid crystal cell 2 from the front and permeates the reflecting/polarizing plate 15.

Accordingly, with the present liquid crystal display device, it is possible to achieve both surface display with the use of one liquid crystal display element 1, to reduce the occupation area of the liquid crystal display device, and to display both of an image to be viewed from the front and an image to be viewed from the back in a display manner using a light from the surface light source 25 and in a display manner using an external light which is a light in the external environment, likewise the liquid crystal display device of the first embodiment.

In the present liquid crystal display device, since a part of an external light coming from the back is reflected by the reflecting/polarizing plate 15, the background of the entire back screen looks like a specular surface due to the reflected light. An image to be viewed from the back is displayed in the specular surface background by a light that comes from the front and permeates the reflecting/polarizing plate 15.

Since the present liquid crystal display device comprises as the reflection/permeation means, the reflecting/polarizing plate 15 for reflecting, of two different linearly-polarized components of an incident light, one polarized component, and letting the other polarized component permeate therethrough behind the liquid crystal layer 5 of the liquid crystal cell 2 of the liquid crystal display element 1, it can let a light be emitted from the entire area of the plurality of pixels 80 of the liquid crystal cell 2 toward the front and the back and display both of an image to be viewed form the front and an image to be viewed from the back by using the entire area of the plurality of pixels 80 of the liquid crystal cell 2, regardless of whether the display is performed by using a light from the surface light source 25 or by using an external light.

Fourth Embodiment

Figure 8:
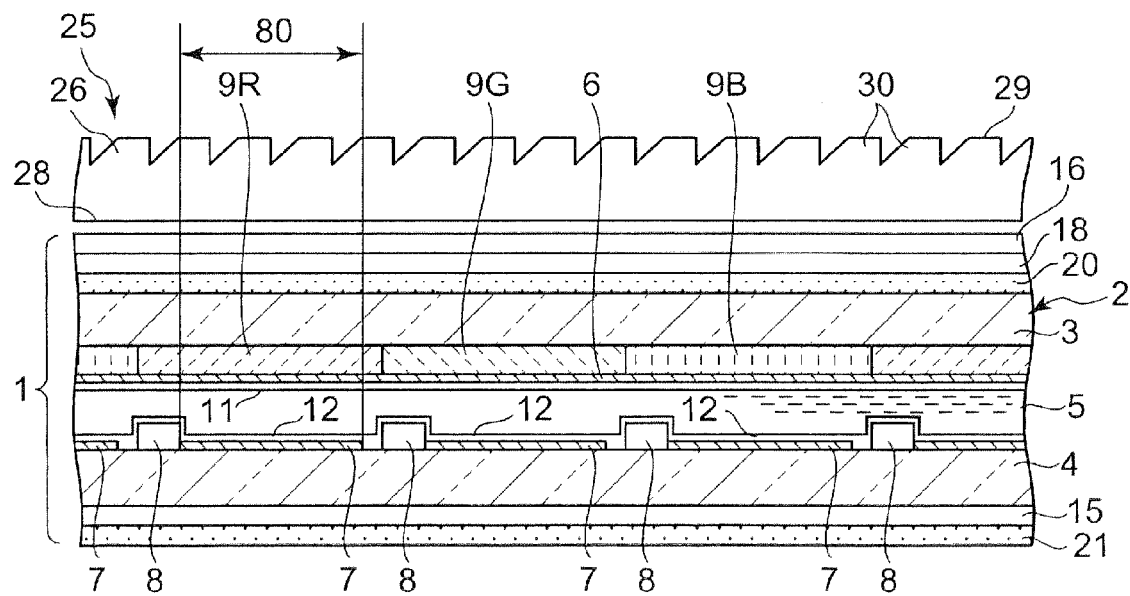
FIG. 8 is a fragmentary sectional view of a liquid crystal display device according to a fourth embodiment of the present invention.

FIG. 8 is a fragmentary sectional view of a liquid crystal display device according to a fourth embodiment of the present invention. The liquid crystal display device of the present embodiment comprises a light scattering layer (hereinafter referred to as scattering layer) 21 behind the reflecting/polarizing plate 15 of the third embodiment.

The present liquid crystal display device lets an external light coming from the back of the liquid crystal display element 1 be scattered by the scattering layer 21 and come to the reflecting/polarizing plate 15, and lets a light returning to the back by being reflected by the reflecting/polarizing plate 15 (a polarized component having a vibration surface parallel with the reflection axis of the reflecting/polarizing plate 15) and a light that comes from the front of the liquid crystal display element 1 to be emitted toward the back be scattered by the scattering layer 21.

The present liquid crystal display device can change the background of the back screen made by the light reflected by the reflecting/polarizing plate 15 from the specular surface background of the above third embodiment to a white background due to scattering of the reflected lights and can restrict floating of the dark display level of the image to be viewed from the back due to scattering of the reflected light, thereby the contrast of the image to be viewed from the back can be improved.

In the third and fourth embodiments, a polarized light separating element constituted by the reflecting/polarizing plate 15 is provided as the reflection/permeation means behind the liquid crystal layer 5 of the liquid crystal cell 2 of the liquid crystal display element 1. As long as having a polarized light separating characteristic of reflecting, of two different polarized components of an incident light, one polarized component and letting the other polarized component permeate, the polarized light separating element may be structured by sandwiching a circularly-polarized light separating plate (for example, a polarized light separating plate made of a cholesteric liquid crystal film) for reflecting, of two circularly-polarized components of an incident light rotating rightward and leftward respectively, one circularly-polarized component and letting the other circularly-polarized component permeate therethrough, between a pair of retardation plates (λ/4 plates) one of which circularly polarizes a linearly-polarized light coming thereto and lets this light come to the circularly-polarized light separating plate, and the other of which linearly polarizes the circularly-polarized light emitted from the circularly-polarized light separating plate and emits this light.

The liquid crystal display device of the first to fourth embodiments comprises a TN type liquid crystal display element 1. However, the liquid crystal display element is not limited to the TN type, but a liquid crystal display element of an STN (Super Twisted Nematic) type, a non-twisted homogeneous aligning type, a ferroelectric type, an antiferroelectric type, etc. may be used.

Further, the liquid crystal display element is not limited to a normally white mode type, but may be a normally black mode type. The liquid crystal cell is not limited to an active matrix type, but may be a simple matrix type.

Further, in the surface light source 25 of the liquid crystal display device of the above-described embodiments, the reflection surface 34 of the light guiding member 31 is constituted by the plurality of prism units 35 which internally reflect a light coming from the incident surface 32 of the light guiding member 31 toward a direction in which an angle to the normal of the slender emission surface 33 of the light guiding member 31 is smaller. However, the reflection surface 34 of the light guiding member 31 may be constituted by continuous inclined surfaces which are inclined toward the slender emission surface 33 in the direction from the incident surface 32 to its opposing surface of the light guiding member 31.

Further, in the surface light source 25 of the above-described embodiments, the reflection surface 29 of the light guiding plate 26 is constituted by the plurality of prism units 30 which internally reflect a light coming from the incident surface 27 of the light guiding plate 26 toward a direction in which an angle to the normal of the emission surface 28 of the light guiding member 26 is smaller. However, the reflection surface 29 of the light guiding plate 26 may be constituted by continuous inclined surfaces which are inclined toward the emission surface 28 in the direction from the incident surface 27 to its opposing surface of the light guiding plate 26.

Further, in the surface light source 25 of the above-described embodiments, one solid light emitting element 38 is arranged so as to oppose to the incident surface 32 of the light guiding member 31. However, in a case where the area of the incident surface 32 of the light guiding member 31 is larger than that of the solid light emitting element 38, a plurality of solid light emitting elements 38 may be arranged so as to oppose to the incident surface 32 of the light guiding member 31.

Further, in the surface light source 25 of the above-described embodiments, one end surface of the light guiding plate 26 is formed as the incident surface 27, the light guiding member 31 whose one end surface is formed as the incident surface 32 is arranged so as to oppose to the incident surface 27 of the light guiding plate 26, and the solid light emitting element 38 is arranged so as to oppose to the incident surface 32 of the light guiding member 31. However, both of the end surfaces of the light guiding member 31 may be formed as incident surfaces 32 respectively, and solid light emitting elements 38 may be arranged so as to oppose to both of the incident surfaces 32. Further, both of the end surfaces of the light guiding plate 26 may be formed as incident surfaces 27, and λ/2 retardation plates 36 and light guiding members 31 may be arranged so as to oppose to both of the incident surfaces 27 as well as solid light emitting elements 38 may be arranged so as to oppose to the incident surfaces 32 of these light guiding members 31 on both sides.

Further, the surface light source 25 arranged at the front of the liquid crystal display element 1 may not comprise the light guiding member 31, but may comprise a light emitting element constituted by a straight tubular cold-cathode tube which is arranged so as to oppose to the incident surface 27 of the light guiding member 26, as long as the surface light source 25 keeps its function of emitting a light toward the liquid crystal display element 1 and letting lights coming from both its front and back permeate therethrough.

Figure 9A:
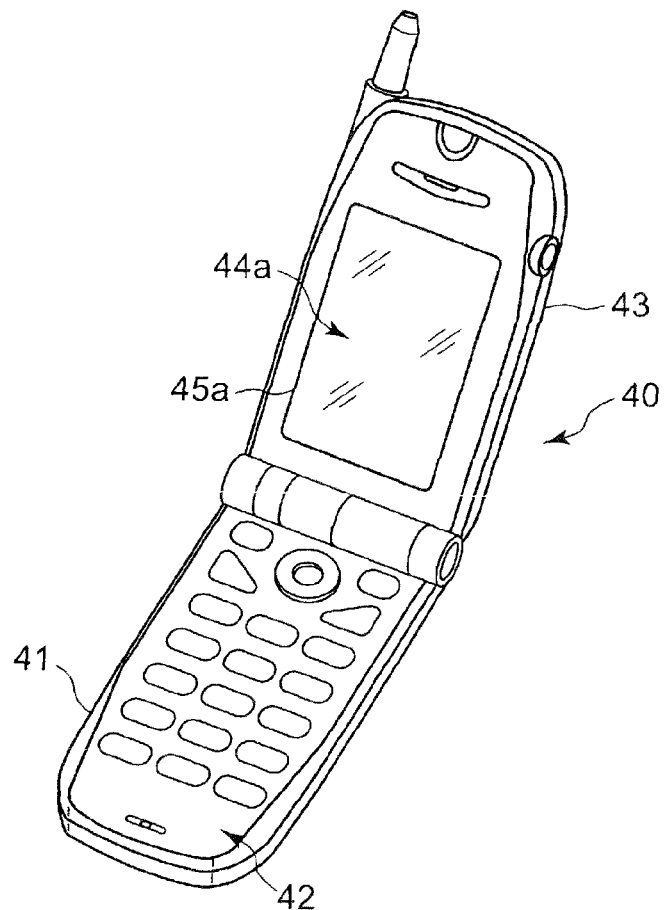
FIGS. 9A and 9B are perspective views of a portable phone utilizing a liquid crystal display device of the present invention.
Figure 9B:
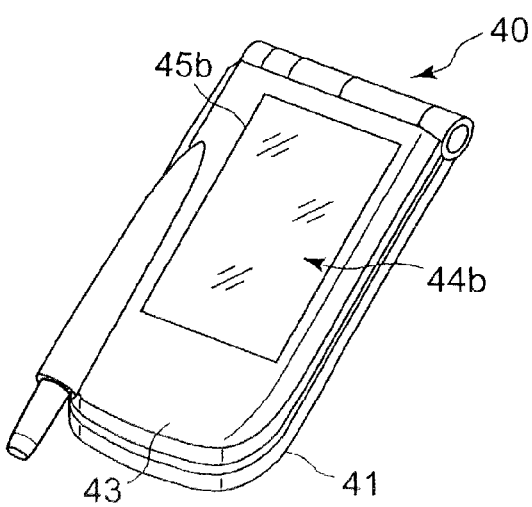
Figure 10A:
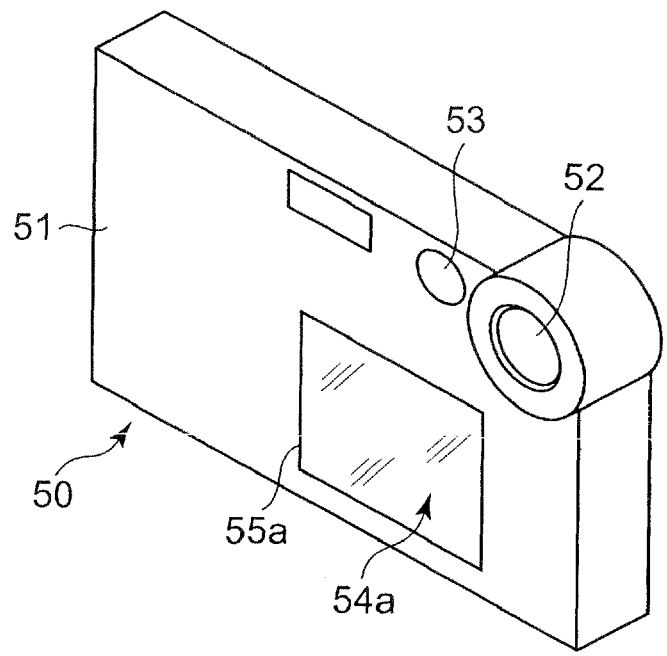
FIGS. 10A and 10B are perspective views of a digital camera utilizing a liquid crystal display device of the present invention.
Figure 10B:
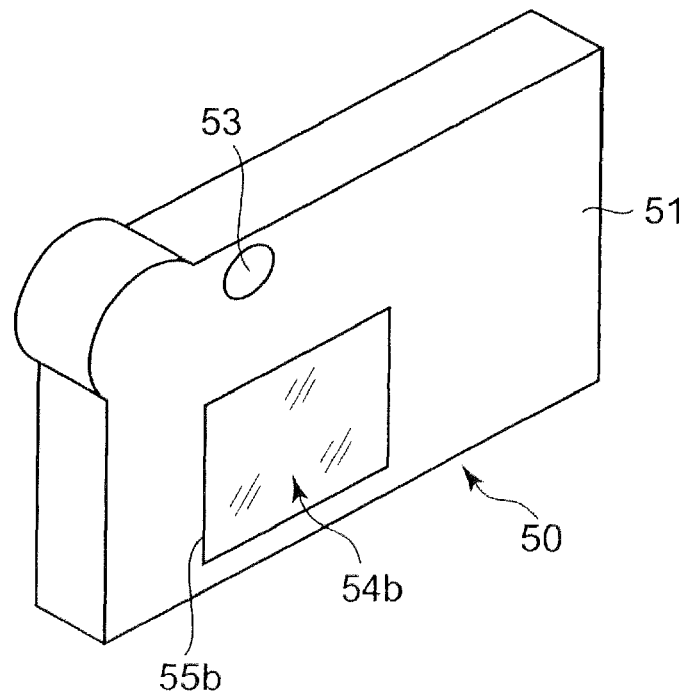
Figure 11A:
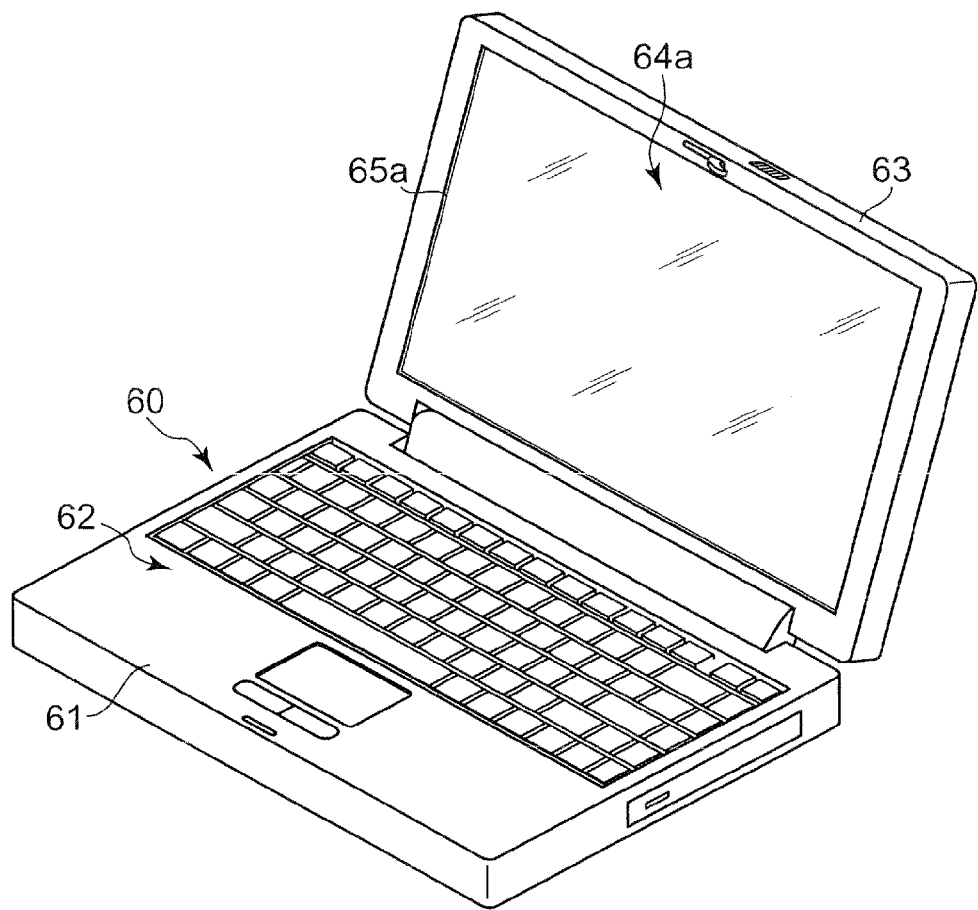
FIGS. 11A and 11B are perspective views of a personal computer utilizing a liquid crystal display device of the present invention.
Figure 11B:
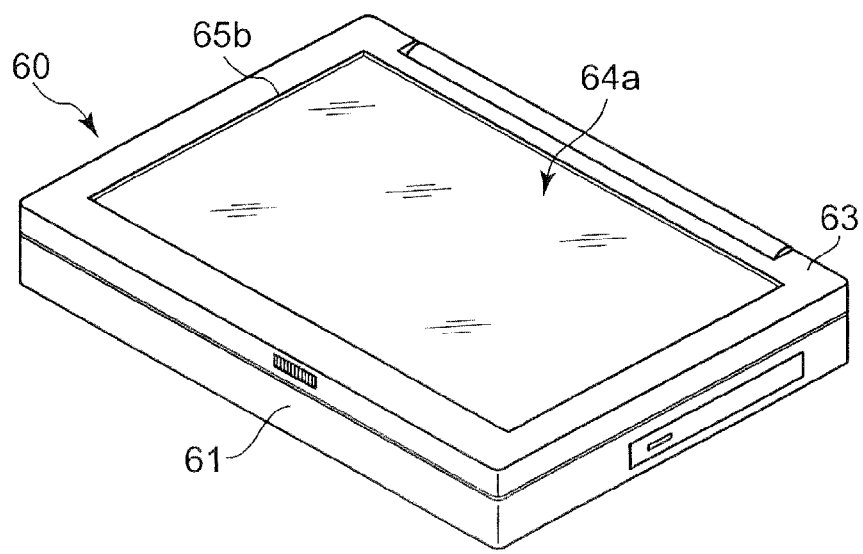
Figure 12A:
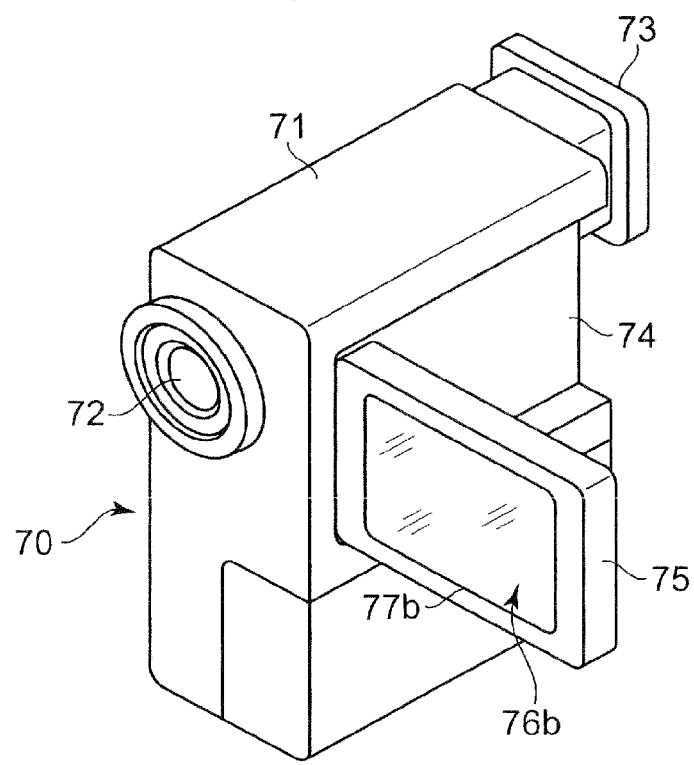
FIGS. 12A and 12B are perspective views of a video camera utilizing a liquid crystal display device of the present invention.
Figure 12B:
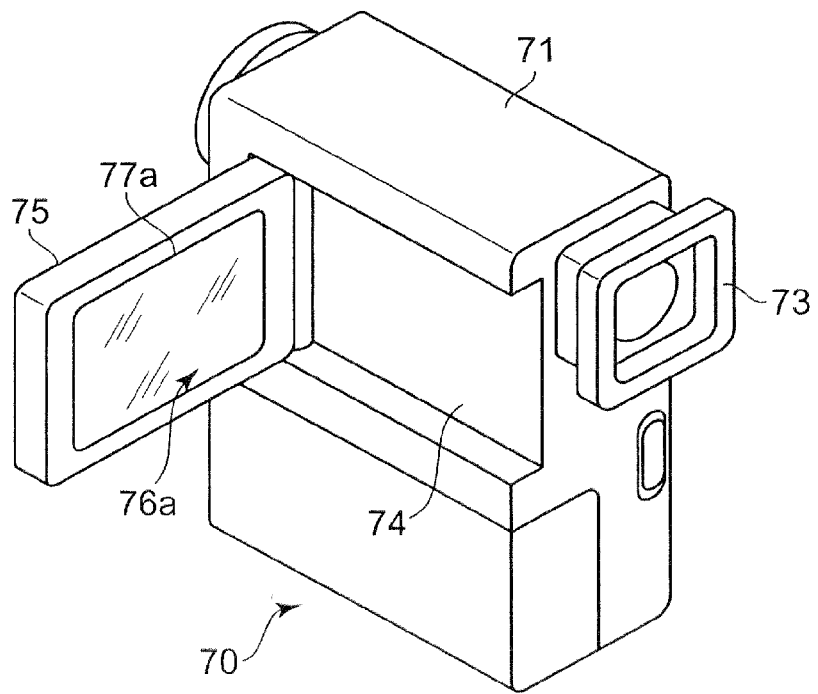

Next, an example where the liquid crystal display device of the present invention is applied to a portable apparatus will be explained. FIG. 9A and FIG. 9B are perspective views of a portable phone as a portable apparatus. FIG. 10A and FIG. 10B are perspective views of a digital camera as a portable apparatus. FIG. 11A and FIG. 11B are perspective views of a personal computer as a portable apparatus. FIG. 12A and FIG. 12B are perspective views of a digital video camera as a portable apparatus.

The portable apparatus shown in FIG. 9A and FIG. 9B is a folding portable phone 40. The portable phone 40 comprises a body 41 having a keyboard 42 on the top surface thereof, and a lid 43 which has display sections 44a and 44b on the two opposing external surfaces thereof, and is rotatably opened and closed with respect to the body 41.

While the lid 43 is opened as shown in FIG. 9A, the portable phone 40 displays main information such as addressee data and e-mails which are to be sent or have been received on the main display section 44a on the internal surface (the surface facing the user of the portable phone 40 when the lid 43 is opened) of the lid 43. While the lid 43 is closed as shown in FIG. 9B, the portable phone 40 displays sub information such as a clock and addressor data on the sub display section 44b on the external surface of the of the lid 43. The display sections 44a and 44b on both surfaces of the portable phone 40 are provided with display windows 45a and 45b on the internal surface and external surface of the lid 43. The liquid crystal display device of any one of the above-described embodiments, for example the liquid crystal display device of the first embodiment is set inside the lid 43 such that the front surface of the liquid crystal display device, i.e. the surface on the side of the light guiding plate 26 of the surface light source 25 is positioned so as to be viewed from the display window 45a on the internal surface of the lid 43, and the back surface of the liquid crystal display device, i.e. the surface on the side of the back polarizing plate 17 of the liquid crystal display element 1 is positioned so as to be viewed from the display window 45b on the external surface of the lid 43.

The portable phone 40 is provided with display drive means for driving the liquid crystal cell 2 of the liquid crystal display element 1 of the liquid crystal display device in a manner that the portable phone 40 displays an image reversely in the left-to-right or right-to-left direction between when the lid 43 is opened and when the lid 43 is closed. Accordingly, a proper image having no reverse can be displayed on the main display section 44a on the internal surface of the lid 43 and on the sub display section 44b on the external surface of the lid 43.

FIG. 10A and FIG. 10B show a thin digital camera 50. The digital camera 50 comprises display sections 54a and 54b at positions corresponding to each other back to back on the two opposing external surfaces of its camera body 51 provided with a photographing lens 52 and a finder 53, i.e. the back surface (the surface facing the user) shown in FIG. 10A, and the front surface (the surface facing the photo subject) shown in FIG. 10B.

The digital camera 50 displays an image being photographed and an already photographed and stored image on the main display section 54a on the back surface and on the sub display section 54b on the front surface. The display sections 54a and 54b on the both surfaces of the digital camera 50 are provided with display windows 55a and 55b on the back surface and front surface of the camera body 51. The liquid crystal display device of any one of the above-described embodiments, for example the liquid crystal display device of the first embodiment is set inside the camera body 51 such that the front surface of the liquid crystal display device (the front surface of the light guiding plate 26 of the surface light source 25) is positioned so as to be viewed from the display window 55a on the back surface of the camera body 51, and the back surface of the liquid crystal display device (the back surface of the back polarizing plate 17 of the liquid crystal display element 1) is positioned so as to be viewed from the display window 55b on the front surface of the camera body 51.

The digital camera 50 can display an image being photographed and an already photographed and stored image on either of the main display section 54a and the sub display section 54b that is selected, and can also display such an image on both of the main display section 54a and the sub display section 54*b* at the same time. In a case where displaying an image on either of the main display section 54*a* and the sub display section 54*b* that is selected, the digital camera 50 can display this image properly with no reverse on either of the main display section 54*a* and the sub display section 54*b* that is selected, by driving the liquid crystal cell 2 of the liquid crystal display element 1 of the liquid crystal display device in a manner that the image is displayed reversely in the left-to-right or right-to-left direction between when the image is displayed on the main display section 54*a* and when the image is displayed on the sub display section 54*b*. In a case where displaying an image on both of the main display section 54*a* and the sub display section 54*b* at the same time, the digital camera 50 displays a proper image on one of the display sections 54*a* and 54*b*, for example, on the main display section 54*a*, and displays on the other display section 54*b*, an image reversed left-side right or right-side left from the proper image on the main display section 54*a*.

FIG. 11A and FIG. 11B show a lap-top personal computer 60. The personal computer 60 comprises a body 61 having a keyboard 62 on the top surface thereof, and a lid 63 which has display sections 64*a* and 64*b* on its two opposing external surfaces and is rotatably opened and closed with respect to the body 61.

While the lid 63 is opened as shown in FIG. 11A, the lap-top personal computer 60 displays main information on the main display section 64*a* on the internal surface (the surface facing the user of the personal computer 60 when the lid 63 is opened) of the lid 63. While the lid 63 is closed as shown in FIG. 11B, the personal computer 60 displays sub information on the sub display section 64*b* on the external surface of the of the lid 63. The display sections 64*a* and 64*b* on both surfaces of the personal computer 60 are provided with display windows 65*a* and 65*b* on the internal surface and external surface of the lid 63. The liquid crystal display device of any one of the above-described embodiments, for example the liquid crystal display device of the first embodiment is set inside the lid 63 such that the front surface of the liquid crystal display device (the front surface of the light guiding plate 26 of the surface light source 25) is positioned so as to be viewed from the display window 65*a* on the internal surface of the lid 63, and the back surface of the liquid crystal display device (the back surface of the back polarizing plate 17 of the liquid crystal display element 1) is positioned so as to be viewed from the display window 65*b* on the external surface of the lid 63.

Even when the lid 63 is closed, the lap-top personal computer 60 can partly display a clock and illustrations in a part of the sub display section 64*b* on the external surface of the lid 63, or can display a television image on the entire sub display section 64*b*. By driving the liquid crystal cell 2 of the liquid crystal display element 1 of the liquid crystal display device in a manner that an image is displayed reversely in the left-to-right or right-to-left direction between when the lid 63 is opened and when the lid 63 is closed, the personal computer 60 can display a proper image having no reverse on both of the main display section 64*a* on the internal surface of the lid 63 and the sub display section 64*b* on the external surface of the lid 63.

The lap-top personal computer 60 may be so structured as to include a transparent touch input panel which would be arranged at the sub display section 64*b* on the external surface of the lid 63 so as to be overlaid on the back surface of the liquid crystal display device. With this structure, even when the lid 63 is closed, the personal computer 60 can be used for inputting information from the touch input panel and displaying this information on the sub display section 64*b*.

FIG. 12A and FIG. 12B show a video camera 70. The video camera 70 comprises a camera body 71 which are provided with a photographing lens 72 and a finder 73 and which has a monitor storage unit 74 in its one side surface, and a monitor unit 75 which has display sections 76*a* and 76*b* on its two opposing external surfaces and which is used by being stood from the monitor storage unit 74.

The video camera 70 displays an image being photographed and an already photographed and stored image on the main display section 76*a* on the back surface of the monitor unit 75 shown in FIG. 12B and on the sub display section 76*b* on the front surface of the monitor unit 75 shown in FIG. 12A. The display sections 76*a* and 76*b* on both surfaces of the monitor unit 75 are provided with display windows 77*a* and 77*b* on the back surface and front surface of the monitor unit 75. The liquid crystal display device of any one of the above-described embodiments, for example the liquid crystal display device of the first embodiment is set inside the monitor unit 75 such that the front surface of the liquid crystal display device (the front surface of the light guiding plate 26 of the surface light source 25) is positioned so as to be viewed from the display window 77*a* on the back surface of the monitor unit 75, and the back surface of the liquid crystal display device (the back surface of the back polarizing plate 17 of the liquid crystal display element 1) is positioned so as to be viewed from the display window 77*b* on the front surface of the monitor unit 75.

The video camera 70 can display an image being photographed and an already photographed and stored image on either of the main display section 76*a* and sub display section 76*b* of the monitor unit 75 that is selected, and can also display such an image on both of the main display section 76*a* and the sub display section 76*b* at the same time. In a case where displaying an image on either of the main display section 76*a* and the sub display section 76*b* that is selected, the video camera 70 can display this image properly with no reverse on either of the main display section 76*a* and the sub display section 76*b* that is selected, by driving the liquid crystal cell 2 of the liquid crystal display element 1 of the liquid crystal display device in a manner that the image is displayed reversely in the left-to-right or right-to-left direction between when the image is displayed on the main display section 76*a* and when the image is displayed on the sub display section 76*b*. In a case where displaying an image on both of the main display section 76*a* and the sub display section 76*b* at the same time, the video camera 70 displays a proper image on one of the display sections 76*a* and 76*b*, for example, on the main display section 76*a*, and displays on the other display section 76*b*, an image reversed left-side right or right-side left from the proper image on the main display section 76*a*.

Since the liquid crystal display device which is mounted inside the portable apparatuses 40, 50, 60, and 70 shown in FIGS. 9A and 9B to FIGS. 12A and 12B performs both surface display with the use of one liquid crystal display element 1, the occupation area and volume required by the liquid crystal display device inside each apparatus is only the occupation area and volume of approximately one liquid crystal display element 1. Accordingly, each apparatus can be miniaturized. Further, each apparatus can display images on both surfaces in a sufficiently large screen size, and can be manufactured at a lower cost than an apparatus in which a both surface display type liquid crystal display device including two liquid crystal display elements is mounted.

Further, since the liquid crystal display device displays images to be viewed from the front and back in a display manner using a light from the surface light source 25 and in a display manner using an external light, the apparatuses 40, 50, 60, and 70 can display images on both surfaces in a display manner using a light from the surface light source 25 of the liquid crystal display device and in display manner using an external light.

The present invention can be applied not only to the portable phone 40, the digital camera 50, the lap-top personal computer 60, and the video camera 70 described above, but also to other portable apparatuses. In that case too, display windows may be provided on two opposing external surfaces of the apparatus, and any of the above-described liquid crystal display devices may be mounted inside the apparatus such that the front surface of the liquid crystal display device faces the display window on one of the two external surfaces of the apparatus and the back surface of the liquid crystal display device faces the display window on the other of the two external surfaces.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-314388 filed on Oct. 29, 2002 and including specification, claims, drawings and summary. The disclosure of the above Japanese Patent Application is incorporated herein by reference in its entirety.

What is claimed:

1. A liquid crystal display device comprising:
   a liquid crystal cell, which comprises a first substrate, a second substrate, and a liquid crystal layer disposed between the first substrate and the second substrate;
   a surface light source, which emits a light toward the liquid crystal cell;
   a polarizing plate disposed between the liquid crystal cell and the surface light source;
   a reflecting/polarizing plate disposed below the polarizing plate so that the liquid crystal cell is between the reflecting/polarizing plate and the polarizing plate, wherein a reflection axis of the reflecting/polarizing plate is orthogonal to a permeation axis of the polarizing plate; and
   a retardation plate disposed between the polarizing plate and the liquid crystal cell.

2. The liquid crystal display device according to claim 1, wherein liquid crystal molecules in the liquid crystal layer of the liquid crystal cell are twist-orientated at a twist angle of substantially 90° when no drive voltage is applied to the liquid crystal layer.

3. The liquid crystal display device according to claim 1, further comprising a scattering layer disposed below the liquid crystal cell so that the reflecting/polarizing plate is between the liquid crystal cell and the scattering layer.

4. The liquid crystal display device according to claim 1, further comprising a scattering layer disposed between the polarizing plate and the liquid crystal cell.

5. The liquid crystal display device according to claim 1, further comprising a scattering layer disposed between the retardation plate and the liquid crystal cell.

6. The liquid crystal display device according to claim 1, further comprising:
   a first scattering layer disposed below the liquid crystal cell so that the reflecting/polarizing plate is between the liquid crystal cell and the scattering layer; and
   a second scattering layer disposed between the polarizing plate and the liquid crystal cell.

7. A liquid crystal display device comprising:
   a liquid crystal cell, which comprises a first substrate, a second substrate, and a liquid crystal layer disposed between the first substrate and the second substrate;
   a surface light source, which emits a light toward the liquid crystal cell;
   a polarizing plate disposed between the liquid crystal cell and the surface light source;
   a reflecting/polarizing plate disposed below the polarizing plate so that the liquid crystal cell is between the reflecting/polarizing plate and the polarizing plate, wherein a reflection axis of the reflecting/polarizing plate is orthogonal to a permeation axis of the polarizing plate;
   a first scattering layer disposed behind the reflecting/polarizing plate so that the reflecting/polarizing plate is between the liquid crystal cell and the scattering layer;
   a second scattering layer disposed between the polarizing plate and the liquid crystal cell; and
   a retardation plate disposed between the polarizing plate and the second scattering layer.

8. A liquid crystal display device comprising:
   a liquid crystal cell, which comprises a first substrate, a second substrate, and a liquid crystal layer disposed between the first substrate and the second substrate;
   a surface light source, which emits a light toward the liquid crystal cell;
   a polarizing plate disposed between the liquid crystal cell and the surface light source;
   a reflecting/polarizing plate disposed below the polarizing plate so that the liquid crystal cell is between the reflecting/polarizing plate and the polarizing plate, wherein a reflection axis of the reflecting/polarizing plate is orthogonal to a permeation axis of the polarizing plate; and
   a plurality of pixel electrodes which are connected to thin film transistors and which are provided on the first substrate of the liquid crystal cell;
   wherein the reflecting/polarizing plate is in close contact with the first substrate on which the pixel electrodes are provided.

9. A liquid crystal display device comprising:
   a liquid crystal cell, which comprises a first substrate, a second substrate, and a liquid crystal layer disposed between the first substrate and the second substrate;
   a surface light source, which emits a light toward the liquid crystal cell;
   a polarizing plate disposed between the liquid crystal cell and the surface light source;
   a reflecting/polarizing plate disposed below the polarizing plate so that the liquid crystal cell is between the reflecting/polarizing plate and the polarizing plate, wherein a reflection axis of the reflecting/polarizing plate is orthogonal to a permeation axis of the polarizing plate; and
   a plurality of pixel electrodes which are connected to thin film transistors and which are provided on the first substrate of the liquid crystal cell;
   wherein the surface light source is disposed above the first substrate on which the pixel electrodes are provided so that the second substrate is between the surface light source and the first substrate.

10. A portable apparatus comprising:

a liquid crystal display device;

a housing, wherein the housing houses the liquid crystal display device and a display window is formed at each of opposing surfaces of the housing;

wherein the liquid crystal display device comprises:

a liquid crystal cell, which comprises a first substrate, a second substrate, and a liquid crystal layer disposed between the first substrate and the second substrate;

a surface light source, which emits a light toward the liquid crystal cell;

a polarizing plate disposed between the liquid crystal cell and the surface light source; and a reflecting/polarizing plate disposed below the polarizing plate so that the liquid crystal cell is between the reflecting/polarizing plate and the polarizing plate, wherein a reflection axis of the reflecting/polarizing plate is orthogonal to a permeation axis of the polarizing plate.

11. The portable apparatus according to claim 10, wherein the housing houses the liquid crystal display device so that the surface light source corresponds to a first display window and the reflecting/polarizing plate corresponds to a second display window.

12. The portable apparatus according to claim 11, wherein the housing comprises:

a body, which has a keyboard on a top surface thereof; and a lid, wherein the lid can be opened and closed on the body, is rotatably supported by the body, and the first display window opposes the keyboard when the lid is closed.

13. The portable apparatus according to claim 10, wherein the portable apparatus has a call function.

14. The portable apparatus according to claim 10, wherein the portable apparatus has an imaging function.

\* \* \* \* \*